(12) United States Patent
Wilson

(10) Patent No.: US 8,033,522 B2
(45) Date of Patent: Oct. 11, 2011

(54) FLUSH VALVE HANDLE ASSEMBLY PROVIDING DUAL MODE OPERATION

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 12 days.

(21) Appl. No.: 12/543,327

(22) Filed: Aug. 18, 2009

(65) Prior Publication Data

US 2010/0012875 A1 Jan. 21, 2010

Related U.S. Application Data

(62) Division of application No. 11/211,273, filed on Aug. 25, 2005, now Pat. No. 7,607,635.

(51) Int. Cl.
*F16K 31/12* (2006.01)

(52) U.S. Cl. .............. 251/40; 251/243; 384/255

(58) Field of Classification Search .......... 251/40, 251/41, 231, 236, 237, 238, 242, 293; 384/255, 384/477

See application file for complete search history.

(56) References Cited

U.S. PATENT DOCUMENTS

| | | |
|---|---|---|
| 605,621 A | 6/1898 | Acklin |
| 934,353 A | 9/1909 | Prichett |
| 1,114,398 A | 10/1914 | Sloan |
| 1,323,703 A | 12/1919 | Linfoot |
| 1,479,313 A * | 1/1924 | Pallavicini ............ 384/447 |
| 1,519,654 A | 12/1924 | Banta |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |
| 1,992,381 A | 2/1935 | Lyons |
| 2,038,135 A | 4/1936 | Sloan |
| 2,136,221 A | 11/1938 | Sloan |
| 2,164,760 A | 7/1939 | Wesson |
| 2,210,860 A | 8/1940 | Regnell |
| 2,369,104 A | 2/1945 | Fredrickson |
| 2,472,576 A | 6/1949 | Dobrick |

(Continued)

FOREIGN PATENT DOCUMENTS

WO WO 2005/124210 12/2005

(Continued)

OTHER PUBLICATIONS

Six-Liter Water Closets Equipped with a Dual Flushing Device, ASME A112, 19.14-2001 1 pg.

(Continued)

*Primary Examiner* — John Fristoe, Jr.
(74) *Attorney, Agent, or Firm* — Foley & Lardner LLP

(57) ABSTRACT

A dual mode flush valve includes a handle assembly having a handle, a bushing and a plunger. The bushing has a sleeve with a passage therethrough for mounting the plunger for sliding and tilting. The passage is defined by first and second partially overlapping bores that coincide at the inner end of the sleeve and are spaced one above the other at the outer end of the sleeve. The bores define a horizontal plunger travel axis and an angled plunger travel axis. Depending on which direction the user actuates the handle the plunger will travel along one of these axes. Travel along the angled axis will lower the plunger tip, allowing earlier clearance of a relief valve and a reduced flow through the flush valve compared to actuation with the plunger travel along the horizontal axis.

23 Claims, 4 Drawing Sheets

U.S. PATENT DOCUMENTS

| | | | |
|---|---|---|---|
| 2,511,545 A | 6/1950 | Roselair | |
| 2,612,187 A | 9/1952 | Romenelii at al. | |
| 2,620,826 A | 12/1952 | Johns | |
| 2,620,828 A | 12/1952 | Persons | |
| 2,734,712 A | 2/1956 | Fraser | |
| 2,738,946 A | 3/1956 | Filliung | |
| 2,775,772 A | 1/1957 | Clarke | |
| 2,858,846 A | 11/1958 | Parker | |
| 3,026,536 A | 3/1962 | Wood | |
| 3,085,779 A | 4/1963 | Philippe | |
| 3,141,177 A | 7/1964 | Kertell | |
| 3,207,467 A | 9/1965 | Bühler | |
| 3,211,416 A | 10/1965 | Billeter | |
| 3,279,742 A | 10/1966 | Billeter | |
| 3,334,359 A | 8/1967 | Weingartner | |
| 3,365,730 A | 1/1968 | Chiappetta | |
| 3,380,077 A | 4/1968 | Armstrong | |
| 3,399,860 A | 9/1968 | Billeter at at. | |
| 3,406,940 A | 10/1968 | Kertell | |
| 3,419,912 A | 1/1969 | Kertell | |
| 3,635,103 A * | 1/1972 | Monti | 475/346 |
| 3,695,254 A | 10/1972 | Blum | |
| 3,745,591 A | 7/1973 | Girten | |
| 3,775,778 A | 12/1973 | Lee | |
| 3,778,023 A | 12/1973 | Billeter | |
| 3,787,902 A | 1/1974 | McCombs | |
| 3,806,962 A | 4/1974 | Sievers | |
| 4,022,380 A | 5/1977 | Scragg | |
| 4,025,968 A | 5/1977 | Davis | |
| 4,080,669 A | 3/1978 | Biggerstaff | |
| 4,101,986 A | 7/1978 | Ng et al. | |
| 4,114,204 A | 9/1978 | Blach | |
| 4,134,570 A | 1/1979 | Walker | |
| 4,135,263 A | 1/1979 | Anderson | |
| 4,160,294 A | 7/1979 | Crumby | |
| 4,202,525 A | 5/1980 | Govaer et al. | |
| 4,240,168 A | 12/1980 | Duke | |
| 4,272,052 A | 6/1981 | Gidner | |
| 4,327,891 A | 5/1982 | Allen et al. | |
| 4,576,272 A | 3/1986 | Morgan, Jr. et al. | |
| 4,817,913 A | 4/1989 | Whiteside | |
| 4,883,254 A | 11/1989 | Whiteside | |
| 4,893,645 A | 1/1990 | Augustinas et al. | |
| 5,026,021 A | 6/1991 | Pino | |
| 5,062,453 A | 11/1991 | Saadi et al. | |
| 5,244,179 A | 9/1993 | Wilson | |
| 5,415,374 A | 5/1995 | Carroll et al. | |
| 5,431,181 A | 7/1995 | Saadi et al. | |
| 5,476,244 A | 12/1995 | Carroll et al. | |
| 5,497,802 A | 3/1996 | Whiteside | |
| 5,505,427 A | 4/1996 | Whiteside | |
| 5,535,781 A | 7/1996 | Paterson et al. | |
| 5,730,415 A | 3/1998 | Gronwick | |
| 5,881,993 A | 3/1999 | Wilson et al. | |
| 6,019,343 A | 2/2000 | Tsai | |
| 6,056,261 A | 5/2000 | Aparicio et al. | |
| 6,094,753 A | 8/2000 | Korte | |
| 6,112,763 A | 9/2000 | Orbell | |
| 6,120,189 A * | 9/2000 | Beagle et al. | 384/429 |
| 6,173,456 B1 | 1/2001 | Nieto | |
| 6,178,567 B1 | 1/2001 | Bliss | |
| 6,189,554 B1 | 2/2001 | Pino | |
| 6,227,219 B1 | 5/2001 | Pino | |
| 6,240,826 B1 * | 6/2001 | Zernickel et al. | 92/72 |
| 6,263,520 B1 | 7/2001 | Song | |
| 6,282,731 B1 | 9/2001 | Mohrman | |
| 6,299,127 B1 | 10/2001 | Wilson | |
| 6,317,899 B1 | 11/2001 | Brewer | |
| 6,336,229 B1 | 1/2002 | Guo | |
| 6,385,786 B1 | 5/2002 | Lester | |
| 6,408,873 B1 | 6/2002 | Hall et al. | |
| 6,442,772 B2 | 9/2002 | Han et al. | |
| 6,467,100 B2 | 10/2002 | Leach | |
| 6,484,327 B2 | 11/2002 | Hand | |
| 6,510,563 B1 | 1/2003 | Jarosinski et al. | |
| 6,554,018 B1 | 4/2003 | Pino | |
| 6,604,249 B2 | 8/2003 | Han et al. | |
| 6,643,855 B1 | 11/2003 | Huang | |
| 6,651,265 B2 | 11/2003 | Kwen | |
| 6,704,945 B2 | 3/2004 | Bellmore | |
| 6,729,602 B2 | 5/2004 | Hankin, Jr. et al. | |
| 6,785,913 B2 | 9/2004 | Ho | |
| 6,823,534 B2 | 11/2004 | Li | |
| 6,829,787 B1 | 12/2004 | Pipenburg | |
| 6,898,808 B2 | 5/2005 | Molho et al. | |
| 6,905,108 B2 | 6/2005 | Hall et al. | |
| 7,062,801 B2 | 6/2006 | Oliver | |
| 7,481,413 B2 | 1/2009 | Funari | |
| 7,607,635 B2 | 10/2009 | Wilson | |
| 2002/0047102 A1 | 4/2002 | Hankin et al. | |
| 2003/0089867 A1 | 5/2003 | Hall et al. | |
| 2003/0110555 A1 | 6/2003 | Tate | |
| 2005/0050625 A1 | 3/2005 | Bayer | |
| 2006/0033060 A1 | 2/2006 | Funari | |
| 2006/0151729 A1 | 7/2006 | Wilson | |
| 2009/0133186 A1 | 5/2009 | Maercovich | |
| 2010/0006155 A1 | 1/2010 | Funari | |

FOREIGN PATENT DOCUMENTS

| WO | WO 2007/098269 | 8/2007 |
|---|---|---|

OTHER PUBLICATIONS

Confidential transcript of Rule 30(b)(6) deposition of Allen Becker, Dated Sep. 28, 2010, *Sloan Valve Co. v. Zurn Industries, Inc. et al.*, United States District Court for the Northern District of Illinois, Eastern Division; Case No. 1:10-cv-00204.

Confidential exhibits to Rule 30(b)(6) deposition of Allen Becker, Dated Sep. 28, 2010, *Sloan Valve Co. v Zurn Industries, Inc. et al.*, United States District Cout for the Northern District of Illinois, Eastern Division, Case No. 1:10-cv-00204.

Confidential transcript of Rule 30(a)(1) deposition of James Bauer, Dated Nov. 18, 2010, *Sloan Valve Co. v. Zurn Industries, Inc. et al.*, United States District Court for the Northern District of Illinois, Eastern Division, Case No. 1:10-cv-00204.

Confidential exhibits to Rule 30(a)(1) deposition of James Bauer, Dated Nov. 18, 2010, *Sloan Valve Co. v. Zurn Industries, Inc. et al.*, United States District Court for the Northern District of Illinois, Eastern Division, Case No. 1:10-cv-00204.

Confidential transcript of Rule 30(a)(1) deposition of Joseph Ballachino, Dated Nov. 19, 2010, *Sloan Valve Co. v Zurn Industries, Inc. et al.*, United States District Court for the Northern District of Illinois, Eastern Division, Case No. 1:10-cv-00204.

Confidential exhibits to Rule 30(a)(1) deposition of Joseph Ballachino, Dated Nov. 19, 2010, *Sloan Valve Co. v. Zurn Industries, Inc. et al.*, United States District Court for the Northern District of Illinois, Eastern Division, Case No. 1:10-cv-00204.

Confidential transcript of Rule 30(b)(6) deposition of Donald Kubiak, Dated Dec. 9, 2010, *Sloan Valve Co. v. Zurn Industries, Inc. et al.*, Untied States District Court for the Northern District of Illinois, Eastern Division, Case No. 1:10-cv-00204.

Zurn engineering drawing 200090 cited in Defendants' Corrected Second Supplemental Initial Invalidity, UnenForceability and Non-Infringement Contentions, Dated May 14, 2010, Zurn Bates No. ZP000037, p. 38, *Sloan Valve Co. v. Zurn Industries, Inc. et al.*, United States District Court for the Northern District of Illinois, Eastern Division, Case No. 1:10-cv-00204.

Photographs of Coyne & Delany foot-activated "Flushboy" flush valve cited in Defendants' Corrected Second Supplemental Initial Invalidity, UnenForceability and Non-Infringement Contentions, Dated May 14, 2010 Zurn Bates Nos. ZP000038-ZP000057, p. 196, *Sloan Valve Co. v. Zurn Industries, Inc. et al.*, United States District Court for the Northern District of Illinois, Eastern Division, Case No. 1:10-cv-00204.

Photographs of new Zurn flush valve handle with brass bushing cited in Defendants' Corrected Second Supplemental Initial Invalidity, UnenForceability and Non-Infringement Contentions, Dated May 14, 2010, Zurn Bates Nos. ZP000062-ZP000067, p. 2, *Sloan Valve Co. v. Zurn Industries, Inc. et al.*, United States District Court for the Northern District of Illinois, Eastern Division, Case No. 1:10-cv-00204.

Photographs of worn Zurn flush valve handle with brass bushing cited in Defendants' Corrected Second Supplemental Initial Invalidity, UnenForceability and Non-Infringement Contentions, Dated May 14, 2010, Zurn Bates Nos. ZP000068-ZP000072, p. 38, *Sloan Valve Co.* v. *Zurn Industries, Inc. et al.*, United States District Court for the Northern District of Illinois, Eastern Division, Case No. 1:10-cv00204.

Photographs of new Zurn flush valve handle with plastic bushing cited in Defendants' Corrected Second Supplemental Initial Invalidity, UnenForceability and Non-Infringement Contentions, Dated May 14, 2010, Zurn Bates Nos. ZP000073-ZP000076, p. 2, *Sloan Valve Co.* v. *Zurn Industries, Inc. et al.*, United States District Court for the Northern District of Illinois, Eastern Division, Case No. 1:10-cv-00204.

Photographs of Sloan long flush valve handle cited in Defendants' Corrected Second Supplemental Initial Invalidity, UnenForceability and Non-Infringement Contentions, Dated May 14, 2010, Zurn Bates Nos. ZP000077-ZP000081, p. 89, *Sloan Valve Co.* v. *Zurn Industries, Inc. et al.*, United States District Court for the Northern District of Illinois, Eastern Division, Case No. 1:10-cv-00204.

Photographs of Sloan short flush valve handle cited in Defendants' Corrected Second Supplemental Initial Invalidity, UnenForceability and Non-Infringement Contentions, Dated May 14, 2010, Zurn Bates nos. ZP000082-ZP000086, p. 138, *Sloan Valve Co.* v. *Zurn Industries, Inc. et al.*, United States District Court for the Northern District of Illinois, Eastern Division, Case No. 1:10-cv-00204.

Transcript of Michael Funari Deposition, Dated Dec. 2, 2010, pp. 1-11 and 65-95, *Sloan Valve Co.* v. *Zurn Industries, Inc. et al.*, United States District Court for the Northern District of Illinois, Eastern Division, Case No. 1:10-cv-00204.

Exhibits 106-111 to Plaintiff Sloan Valve Company's Deposition of Michael Funari, Dated Dec. 2, 2010, *Sloan Valve Co.* v. *Zurn Industries, Inc. et al.*, United States District Court for the Northern District of Illinois, Eastern Division, Case No. 1:10-cv-00204.

Photographs of Zurn Australian dual flush valve relating to Plaintiff Sloan Valve Company's Deposition of Michael Funari, Held on Dec. 2, 2010, Bates Nos. SVC0317815-SVC0317819, p. 82, *Sloan Valve Co.* v. *Zurn Industries, Inc. et al.*, United States District Court for the Northern District of Illinois, Eastern Division, Case No. 1:10-cv-00204.

Transcript of 30(b)(6) Deposition (Worn Valve) of Michael Funari, Dated Dec. 16, 2010, pp. 1-85 and 90-109, *Sloan Valve Co.* v. *Zurn Industries, Inc. et al.*, United States District Court for the Northern District of Illinois, Eastern Division, Case No. 1:10-cv-00204.

Exhibits 250-55 and 262 to Plaintiff Sloan Valve Company's Deposition of Michael Funari, Dated Dec. 16, 2010, *Sloan Valve Co.* v. *Zurn Industries, Inc. et al.*, United States District Court for the Northern District of Illinois, Eastern Division, Case No. 1:10-cv-00204.

Photographs of Zurn handle life testing relating to Exhibits 250-253 and 262 to Plaintiff Sloan Valve Company's Deposition of Michael Funari, Held on Dec. 16, 2010, Bates No. SVC0317805-SVC0317814 and SVC0317612-SVC0317660, pp. 7, 47, 58, 64, and 102, *Sloan Valve Co.* v. *Zurn Industries, Inc. et al.*, United States District Court for the Northern District of Illinois, Eastern Division, Case No. 1:10-cv-00204.

Photographs of Zurn's manufactured worn bushings related to Plaintiff Sloan Valve Company's Deposition of Michael Funari, Held on Dec. 16, 2010, Bates Nos. SVC0317670-SVC0317671 and SVC0317827-SVC0317830, pp. 32, 42, *Sloan Valve Co.* v. *Zurn Industries, Inc. et al.*, United States District Court for the Northern District of Illinois, Eastern Division, Case No. 1:10-cv-00204.

Drawings relating to U.S. Patent No. 3,279,742 ("Billeter"), Bates Nos. SVC0317839-SVC0317841, *Sloan Valve Co.* v. *Zurn Industries, Inc. et al.*, United States District Court for the Northern District of Illinois, Eastern Division, Case No. 1:10-cv-00204.

"EX 500 Flush Valve Study," Bates Nos. SVC0317872-SVC0317886, *Sloan Valve Co.* v. *Zurn Industries, Inc. et al.*, United States District Court for the Northern District of Illinois, Eastern Division, Case No. 1:10-cv-00204.

Confidential Exhibits to Deposition of Matthew Martin, United States District Court for the Northern District of Illinois, Eastern Division, Case No. 1:10-cv-00204, Dated Aug. 11, 2010.

Confidential Exhibits to Deposition of Michael Rechtin, United States District Court for the Northern District of Illinois, Eastern Division, Case No. 1:10-cv-00204, Dated Aug. 12, 2010.

Confidential Exhibits to Deposition of Joel Bock, United States District Court for the Northern District of Illinois, Eastern Division, Case No. 1:10-cv-00204, Dated Aug. 13, 2010.

Confidential Exhibits to Deposition of Peter Jahrling, United States District Court for the Northern District of Illinois, Eastern Division, Case No. 1:10-cv-00204, Dated Oct. 11, 2010.

Confidential Exhibits to Deposition of Mark Gutting-Kilzer, United States District Court for the Northern District of Illinois, Eastern Division, Case No. 1:10-cv-00204, Dated Oct. 12, 2010.

Confidential Exhibits to Deposition of Daniel Carroll, United States District Court for the Northern District of Illinois, Eastern Division, Case No. 1:10-cv-00204, Dated Oct. 13, 2010.

Confidential Exhibits to Deposition of John Wilson, United States District Court for the Northern District of Illinois, Eastern Division, Case No. 1:10-cv-00204, Dated Oct. 14, 2010.

Confidential Exhibits to Deposition of Julie Shireman, United States District Court for the Northern District of Illinois, Eastern Division, Case No. 1:10-cv-00204, Dated Oct. 15, 2010.

Deposition Transcript of Mr. Jim Allen, *Sloan Valve Co.* v. *Zurn Industries, Inc. et al.*, United States District Court for the Northern District of Illinois, Eastern Division, Case No. 1:10-cv-00204, Dated Nov. 12, 2010.

Confidential Exhibits to Deposition of Jim Allen, United States District Court for the Northern District of Illinois, Eastern Division, Case No. 1:10-cv-00204, Dated Nov. 12, 2010.

Report of Preliminary Flush Volume Tests Conducted by Zurn on Two Sloan Dual Flush Handles and One Sloan Single Flush Handle, Plaintiff Deposition Exhibits No. 134, Dated Nov. 30, 2005 According to Zurn.

U.S. Appl. No. 60/579,398, filed Jun. 14, 2004, Funari.

U.S. Appl. No. 95/001,187, filed Jul. 10, 2009, Funari.

PACER Docket Report for *Sloan Valve Co.* v. *Zurn Industries, Inc. et al.*, United States District Court for the Northern District of Illinois, Eastern Division, Case No. 1:10-cv-00204 as of Jan. 5, 2011.

Complaint, *Sloan Valve Co.* v. *Zurn Industries, Inc. et al.*, United States District Court for the Northern District of Illinois, Eastern Division, Case No. 1:10-cv-00204, Filed Jan. 13, 2010.

Answer, *Sloan Valve Co.* v. *Zurn Industries, Inc. et al.*, United States District Court for the Northern District of Illinois, Eastern Division, Case No. 1:10-cv-00204, Filed Feb. 8, 2010.

Motion to Dismiss, *Sloan Valve Co.* v. *Zurn Industries, Inc. et al.*, United States District Court for the Northern District of Illinois, Eastern Division, Case No. 1:10-cv-00204, Filed Feb. 23, 2010.

Memorandum by Sloan Valve Company in Support of Motion to Dismiss, *Sloan Valve Co.* v. *Zurn Industries, Inc. et al.*, United States District Court for the Northern District of Illinois, Eastern Division, Case No. 1:10-cv-00204, Filed Feb. 23, 2010.

Memorandum in Opposition to Motion to Dismiss, *Sloan Valve Co.* v. *Zurn Industries, Inc. et al.*, United States District Court for the Northern District of Illinois, Eastern Division, Case No. 1:10-cv-00204, Filed Mar. 10, 2010.

Reply Memorandum in Support of Motion to Dismiss, *Sloan Valve Co.* v. *Zurn Industries, Inc. et al.*, United States District Court for the Northern District of Illinois, Eastern Division, Case No. 1:10-cv-00204, Filed Mar. 17, 2010.

Motion to Bifurcate, *Sloan Valve Co.* v. *Zurn Industries, Inc. et al.*, United States District Court for the Northern District of Illinois, Eastern Division, Case No. 1:10-cv-00204, Filed Mar. 19, 2010.

Memorandum in Support of Bifurcation, *Sloan Valve Co.* v. *Zurn Industries, Inc. et al.*, United States District Court for the Northern District of Illinois, Eastern Division, Case No. 1:10-cv-00204, Filed Mar. 19, 2010.

Memorandum in Opposition to Motion to Bifurcate, *Sloan Valve Co.* v. *Zurn Industries, Inc. et al.*, United States District Court for the Northern District of Illinois, Eastern Division, Case No. 1:10-cv-00204, Filed Apr. 8, 2010.

Reply Memorandum in Support of Motion to Bifurcate, *Sloan Valve Co.* v. *Zurn Industries, Inc. et al.*, United States District Court for the Northern District of Illinois, Eastern Division, Case No. 1:10-cv-00204, Filed Apr. 19, 2010.

Amended Answer to Plaintiff's Complaint, *Sloan Valve Co.* v. *Zurn Industries, Inc. et al.*, United States District Court for the Northern District of Illinois, Eastern Division, Case No. 1:10-cv-00204, Filed May 18, 2010.
Answer to Amended Counterclaim, *Sloan Valve Co.* v. *Zurn Industries, Inc. et al.*, United States District Court for the Northern District of Illinois, Eastern Division, Case No. 1:10-cv-00204, Filed Jun. 8, 2010.
Second Amended Answer to Plaintiffs Complaint, *Sloan Valve Co.* v. *Zurn Industries, Inc. et al.*, United States District Court for the Northern District of Illinois, Eastern Division, Case No. 1:10-cv-00204, Filed Jul. 22, 2010.
Motion to Compel Discovery and to Award Sanctions, *Sloan Valve Co.* v. *Zurn Industries, Inc. et al.*, United States District Court for the Northern District of Illinois, Eastern Division, Case No. 1:10-cv-00204, Filed Jul. 23, 2010.
Memorandum in Support of Motion to Compel, *Sloan Valve Co.* v. *Zurn Industries, Inc. et al.*, United States District Court for the Northern District of Illinois, Eastern Division, Case No. 1:10-cv-00204, Filed Jul. 23, 2010.
Answer to Counterclaim Second Amended Counterclaim, *Sloan Valve Co.* v. *Zurn Industries, Inc. et al.*, United States District Court for the Northern District of Illinois, Eastern Division, Case No. 1:10-cv-00204, Filed Aug. 12, 2010.
Motion for Sanctions, *Sloan Valve Co.* v. *Zurn Industries, Inc. et al.*, United States District Court for the Northern District of Illinois, Eastern Division, Case No. 1:10-cv-00204, Filed Sep. 20, 2010.
Memorandum in Support of Motion for Sanctions, *Sloan Valve Co.* v. *Zurn Industries, Inc. et al.*, United States District Court for the Northern District of Illinois, Eastern Division, Case No. 1:10-cv-00204, Filed Sep. 20, 2010.
Motion to Stay, *Sloan Valve Co.* v. *Zurn Industries, Inc. et al.*, United States District Court for the Northern District of Illinois, Eastern Division, Case No. 1:10-cv-00204, Filed Sep. 20, 2010.
Memorandum in Support of Motion to Stay, *Sloan Valve Co.* v. *Zurn Industries, Inc. et al.*, United States District Court for the Northern District of Illinois, Eastern Division, Case No. 1:10-cv-00204, Filed Sep. 20, 2010.
Memorandum in Opposition to Motion for Sanctions, *Sloan Valve Co.* v. *Zurn Industries, Inc. et al.*, United States District Court for the Northern District of Illinois, Eastern Division, Case No. 1:10-cv-00204, Filed Sep. 29, 2010.
Plaintiff's Motion for Partial Summary Judgment on Defendants' Invalidity Defenses and Zurn's Counterclaim for Invalidity Based on U.S. Patent No. 3,279,742 (Billeter), Filed Nov. 15, 2010.
Memorandum in Support of Motion for Partial Summary Judgment, *Sloan Valve Co* v *Zurn Industries, Inc et al.*, United States District Court for Northern Illinois, Eastern Division, Case No. 1:10-cv-00204, Filed Nov. 15, 2010.
Plaintiff's Rule 56.1(A)(3) Statement, *Sloan Valve Co.* v. *Zurn Industries, Inc. et al.*, United States District Court for the Northern District of Illinois, Eastern Division, Case No. 1:10-cv-00204, Filed Nov. 15, 2010.
Renewed Motion to Stay, *Sloan Valve Co.* v. *Zurn Industries, Inc. et al.*, United States District Court for the Northern District of Illinois, Eastern Division, Case No. 1:10-cv-00204, Filed Dec. 8, 2010.
Memorandum in Support of Motion to Stay, *Sloan Valve Co.* v. *Zurn Industries, Inc. et al.*, United States District Court for the Northern District of Illinois, Eastern Division, Case No. 1:10-cv-00204, Filed Dec. 8, 2010.
Plaintiff's Brief in Opposition to Renewed Motion to Stay, *Sloan Valve Co.* v. *Zurn Industries, Inc. et al.*, United States District Court for the Northern District of Illinois, Eastern Division, Case No. 1:10-cv-00204, Filed Dec. 15, 2010.
Motion for Leave to File Brief in Opposition, *Sloan Valve Co.* v. *Zurn Industries, Inc. et al.*, United States District Court for the Northern District of Illinois, Eastern Division, Case No. 1:10-cv-00204, Filed Dec. 15, 2010.
Notice of Allowance for Mexican Patent Application No. PA/a/2006/009775, Issued Feb. 8, 2010.
Response to Second Office Action for Mexican Patent Application No. PA/a/2006/009775, Filed Nov. 9, 2009.
Second Office Action for Mexican Patent Application No. PA/a/2006/009775, Dated Aug. 6, 2009.
Response to First Office Action for Mexican Patent Application No. PA/a/2006/009775, Filed May 28, 2009.
First Office Action for Mexican Patent Application No. PA/a/2006/009775, Dated Apr. 20, 2009.
Notice of Allowance for Canadian Patent Application No. 2,557,102, Issued Oct. 27, 2010.
Response to Second Office Action for Canadian Patent Application No. 2,557,102, Filed Jul. 27, 2010.
Second Office Action for Canadian Patent Application No. 2,557,102 Dated Jul. 15, 2010.
Response to First Office Action for Canadian Patent Application No. 2,557,102, Filed Apr. 6, 2010.
First Office Action for Canadian Patent Application No. 2,557,102, Dated Oct. 7, 2009.
Petition for Reinstatement and Amendment of Canadian Patent Application No. 2,556,377, Filed Jun. 3, 2010.
Voluntary Amendment and Response to Restriction Requirement for Canadian Patent Application No. 2,556,377, Filed Apr. 6, 2010.
Restriction Requirement for Canadian Patent Application No. 2,556,377, Issued Oct. 7, 2009.
Voluntary Amendment for Canadian Patent Application No. 2,556,377, Filed Apr. 29, 2009.
Response to Office Action for Chinese Patent Application No. 200610121276.0 Filed May 12, 2010.
First Office Action for Chinese Patent Application No. 200610121276.0, Issued Jan. 22, 2010.
Response to Notification Relation to Unity of Invention for Chinese Patent Application No. 200610121276.0, Filed Jun. 11, 2009.
Notification Relation to Unity of Invention for Chinese Patent Application No. 200610121276.0, Issued Mar. 27, 2009.
Response to First Office Action for Mexican Patent Application No. PA/a/2006/009593, Filed Oct. 1, 2010.
Voluntary Amendment for Mexican Patent Application No. PA/a/2006/009593, Filed Oct. 24, 2008.
Voluntary Amendment for Chinese Patent Application No. 200910262261.X, Filed Sep. 9, 2010.
Notification to Grant Patent for Chinese Patent Application No. 20061012128.1, Issued Sep. 13, 2010.
Response to Second Office Action for Chinese Patent Application No. 20061012128.1, Filed Jun. 2, 2010.
Second Office Action for Chinese Patent Application No. 20061012128.1, Issued Apr. 6, 2010.
Response to First Office Action for Chinese Patent Application No. 20061012128.1, Filed Dec. 15, 2009.
First Office Action for Chinese Patent Application No. 20061012128.1, Issued Jun. 19, 2009.
Response to Office Action for Chinese Patent Application No. 200780012750.9, Filed Sep. 8, 2010.
Office Action for Chinese Patent Application No. 200780012750.9, Issued May 11, 2010.
First Office Action for Canadian Patent Application No. 2,644,075, Issued May 14, 2010.
Response to Office Action for Canadian Patent Application No. 2,557,102, Filed Jul. 27, 2010.
First Office Action for Canadian Patent Application No. 2,557,102, Issued Jul. 15, 2010.
Notification of Provisional Rejection for Korean Patent Application No. 10-2008-7023167, Issued Apr. 6, 2010.
Written Opinion of the International Search Authority and International Search Report for PCT/US2007/004983, Mailed Sep. 7, 2007.
International Preliminary Report on Patentability for PCT Application No. PCT/US2007/004983, Issued Sep. 2, 2008.
Preliminary Amendment for U.S. Appl. No. 12/543,327, filed Feb. 9, 2010.
Notice of Allowance for U.S. Appl. No. 11/211,273, Issued Jul. 9, 2009.
Response to Office Action for U.S. Appl. No. 11/211,273, filed Apr. 22, 2009.
First Office Action for U.S. Appl. No. 11/211,273, Issued Feb. 18, 2009.

Response to Restriction Requirement and Preliminary Amendment for U.S. Appl. No. 11/211,273, filed Jul. 17, 2008.
Restriction Requirement for U.S. Appl. No. 11/211,273, Issued Jul. 8, 2008.
Preliminary Amendment for U.S. Appl. No. 11/211,273, filed Apr. 7, 2006.
Plaintiff's Initial Infringement Contentions, *Valve Co.* v. *Zurn Industries, Inc. et al.*, United States District Court for the Northern District of Illinois, Eastern Division, Case No. 1:10-cv-00204, Dated Mar. 29, 2010.
Exhibit A: Plaintiff's Initial Infringement Contentions, *Valve Co.* v. *Zurn Industries, Inc. et al.*, United States District Court for the Northern District of Illinois, Eastern Division, Case No. 1:10-cv-00204, Dated Mar. 29, 2010.
Defendants' Initial Invalidity, UnenForceability and Non-Infringement Contentions, *Valve Co.* v. *Zurn Industries, Inc. et al.*, United States District Court for the Northern District of Illinois, Eastern Division, Case No. 1:10-cv-00204, Dated Apr. 16, 2010.
Defendants' Supplemental Initial Invalidity, UnenForceability and Non-Infringement Contentions, *Valve Co.* v. *Zurn Industries, Inc. et al.*, United States District Court for the Northern District of Illinois, Eastern Division, Case No. 1:10-cv-00204, Dated Apr. 26, 2010.
Defendants' Corrected Second Supplemental Initial Invalidity, UnenForceability and Non-Infringement Contentions, *Valve Co.* v. *Zurn Industries, Inc. et al.*, United States District Court for the Northern District of Illinois, Eastern Division, Case No. 1:10-cv-00204, Dated May 14, 2010.
Exhibit A: Defendants' Corrected Second Supplemental Initial Invalidity, UnenForceability and Non-Infringement Contentions, *Valve Co.* v. *Zurn Industries, Inc. et al.*, United States District Court for the Northern District of Illinois, Eastern Division, Case No. 1:10-cv-00204, Dated May 14, 2010.
Exhibit B: Defendants' Corrected Second Supplemental Initial Invalidity, UnenForceability and Non-Infringement Contentions, *Valve Co.* v. *Zurn Industries, Inc. et al.*, United States District Court for the Northern District of Illinois, Eastern Division, Case No. 1:10-cv-00204, Dated May 14, 2010.
Plaintiff Sloan Valve Company's Responses to Defendants' Second Supplemental Invalidity Contentions, *Valve Co.* v. *Zurn Industries, Inc. et al.*, United States District Court for the Northern District of Illinois, Eastern Division, Case No. 1:10-cv-00204, Dated Jun. 4, 2010.
Defendants' Supplemental Invalidity Contentions Under 35 U.S.C. § 112 and Non-Infringement Contentions, *Valve Co.* v. *Zurn Industries, Inc. et al.*, United States District Court for the Northern District of Illinois, Eastern Division, Case No. 1:10-cv-00204, Dated Jun. 11, 2010.
Defendants' Responses to Plaintiffs Interrogatories 11-13, *Sloan Valve Co.* v. *Zurn Industries, Inc. et al.*, United States District Court for the Northern District of Illinois, Eastern Division, Case No. 1:10-cv-00204, Dated Jun. 25, 2010.
Plaintiff's Supplemental Responses to Defendants' First Set of Interrogatories, *Sloan Valve Co.* v. *Zurn Industries, Inc. et al.*, United States District Court for the Northern District of Illinois, Eastern Division, Case No. 1:10-cv-00204, Dated Jul. 9, 2010.
Defendants' Third Supplemental Responses to Plaintiff's Interrogatories Nos. 1-10, *Sloan Valve Co.* v. *Zurn Industries, Inc. et al.*, United States District Court for the Northern District of Illinois, Eastern Division, Case No. 1:10-cv-00204, Dated Jul. 9, 2010.
Defendants' Response to Plaintiff's Interrogatory No. 14, *Sloan Valve Co.* v. *Zurn Industries, Inc. et al.*, United States District Court for the Northern District of Illinois, Eastern Division, Case No. 1:10-cv-00204, Dated Aug. 4, 2010.
Plaintiff's Responses to Defendants' Interrogatories Nos. 11-13, *Sloan Valve Co.* v. *Zurn Industries, Inc. et al.*, United States District Court for the Northern District of Illinois, Eastern Division, Case No. 1:10-cv-00204, Dated Sep. 24, 2010.
Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit A: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit B: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit C: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit D: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit E: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit F: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit G: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 1: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 2: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 3: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 4: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 5: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Appendix 6: Defendants' Final Invalidity and UnenForceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Plaintiff's Final Infringement Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Exhibit A: Plaintiff's Final Infringement Contentions, *Sloan Valve Co.* v. *Zurn Industries, Inc. et al.*, United States District Court for the Northern District of Illinois, Eastern Division, Case No. 1:10-cv-00204, Dated Oct. 22, 2010.
Defendants' Final Non-Infringement Contentions, *Sloan Valve Co.* v. *Zurn Industries, Inc. et al.*, United States District Court for the Northern District of Illinois, Eastern Division, Case No. 1:10-cv-00204, Dated Nov. 22, 2010.
Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010.
Exhibit A: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010.
Exhibit B: Plaintiff Sloan Valve Company's Responses to Defendants' Final Invalidity Contentions, *Sloan Valve Co.* v. *Zurn Indus-*

*tries, Inc. et al.*, United States District Court for the Northern District of Illinois, Eastern Division, Case No. 1:10-cv-00204, Dated Nov. 22, 2010.
Exhibit C: Plaintiff Sloan Valve Company's Responses to Defendants' Final Invalidity Contentions, *Sloan Valve Co. v. Zurn Industries, Inc. et al.*, United States District Court for the Northern District of Illinois, Eastern Division, Case No. 1:10-cv-00204, Dated Nov. 22, 2010.
Exhibit D: Plaintiff Sloan Valve Company's Responses to Defendants' Final Invalidity Contentions, *Sloan Valve Co. v. Zurn Industries, Inc. et al.*, United States District Court for the Northern District of Illinois, Eastern Division, Case No. 1:10-cv-00204, Dated Nov. 22, 2010.
Exhibit E: Plaintiff Sloan Valve Company's Responses to Defendants' Final Invalidity Contentions, *Sloan Valve Co. v. Zurn Industries, Inc. et al.*, United States District Court for the Northern District of Illinois, Eastern Division, Case No. 1:10-cv-00204, Dated Nov. 22, 2010.
Exhibit F: Plaintiff Sloan Valve Company's Responses to Defendants' Final Invalidity Contentions, *Sloan Valve Co. v. Zurn Industries, Inc. et al.*, United States District Court for the Northern District of Illinois, Eastern Division, Case No. 1:10-cv-00204, Dated Nov. 22, 2010.
Exhibit G: Plaintiff Sloan Valve Company's Responses to Defendants' Final Invalidity Contentions, *Sloan Valve Co. v. Zurn Industries, Inc. et al.*, United States District Court for the Northern District of Illinois, Eastern Division, Case No. 1:10-cv-00204, Dated Nov. 22, 2010.
Plaintiff's Proposed Claim Construction Pursuant to L.P.R. 4.1, *Valve Co. v. Zurn Industries, Inc. et al.*, United States District Court for the Northern District of Illinois, Eastern Division, Case No. 1:10-cv-00204, Dated Dec. 6, 2010.
Defendants' Proposed Claim Terms to be Construed and Proposed Constructions, *Valve Co. v. Zurn Industries, Inc. et al.*, United States District Court for the Northern District of Illinois, Eastern Division, Case No. 1:10-cv-00204, Dated Dec. 6, 2010.
First Office Action for U.S. Appl. No. 12/353,569, Issued May 17, 2010.
Owners response to First Office Action for U.S. Appl. No. 12/353,569, filed Oct. 26, 2010.
Response to Patent Office Communication regarding Defects and Request for Re-Examination of US Patent No. 7,481,413 Filed Jul. 10, 2009.
Declaration under 35 C.F.R.§ 1.132 by Mr. Michael Funari for U.S. Appl. No. 95/001,187, Executed Oct. 20, 2009, Exhibit A: Test Data.
Request for Ex Parte Re-Examination of U.S. Patent No. 7,607,635, Filed Sep. 17, 2010.
Six-Liter Water Closets Equipped with a Dual Flushing Device, ASME A112.19. 14-2001.
Transmittal Letter for Request for Inter Partes Reexamination of U.S. Patent No. 7,481,413, Filed May 11, 2009.
Request for Inter Partes Reexamination of U.S. Patent No. 7,481,413, Filed May 11, 2009.
Appendix B: Information Disclosure Statement for Reexamination of U.S. Patent No. 7,481,413, Filed May 11, 2009.
Appendix C: Chart Comparing Claims 1, and 4-16 of the '413 to the teachings of the U.S. Patent No. 2,210,860 Issued to Regnell on Aug. 6, 1940 ("the Regnell Reference") Filed with the Request for Inter Parties Reexamination of U.S. Patent No. 7,481,413, Filed May 11, 2009.
Appendix D: Chart Comparing Chart Comparing Claims 1-16 of the '413 to the Teachings of U.S. Patent No. 2,210,860 Issued to Regnell and to Other Cited Prior Art References Filed with the Request for Inter Parties Reexamination of U.S. Patent No. 7,481,413, Filed May 11, 2009.
Appendix E: Chart Comparing Chart Comparing Claims 1-16 of the '413 to the Teachings of U.S. Patent No. 2,620,826 on Mar. 24, 1949, ("the Johns Reference") and Other Cited Prior Art References Filed with the Request for Inter Parties Reexamination of U.S. Patent No. 7,481,413, Filed May 11, 2009.
Appendix F: Chart Comparing Claims 1-16 of the '413 to the teachings of the U.S. Patent No. 1,912,937 Issued to George on Jun. 6,
1933, (the George Reference) Filed with the Request for Inter Parties Reexamination of U.S. Patent No. 7,481,413, Filed May 11, 2009.
Appendix G: Chart Comparing Chart Comparing Claims 1-16 of the '413 to the Teachings of the George Reference and Other Cited Prior Art References Filed with the Request for Inter Parties Reexamination of U.S. Patent No. 7,481,413, Filed May 11, 2009.
Appendix H: Chart Comparing Claims 1-16 of the '413 to the teachings of the U.S. Patent No. 3,207,467 Issued to Buhler on Aug. 5, 1963 ("the Buhler Reference") Filed with the Request for Inter Parties Reexamination of U.S. Patent No. 7,481,413, Filed May 11, 2009.
Appendix I: Chart Comparing Chart Comparing Claims 1-16 of the '413 to the Teachings of the Buhler Reference and Other Cited Prior Art References Filed with the Request for Inter Parties Reexamination of U.S. Patent No. 7,481,413, Filed May 11, 2009.
Appendix J, Sloan Flush Valves Catalog 32, Chicago, Illinois, Filed with the Request for Inter Parties Reexamination of U.S. Patent No. 7,481,413, Filed May 11, 2009.
Appendix K, Sloan Flush Valves Catalog 40, Chicago, Illinois Filed with the Request for Inter Parties Reexamination of U.S. Patent No. 7,481,413, Filed May 11, 2009.
Corrected Request for Inter Partes Reexamination of U.S. Patent No. 7,481,413 Filed Jul. 10, 2009.
Appendix B: Information Disclosure Statement Filed with the Corrected Request for Inter Parties Reexamination of U.S. Patent No. 7,481,413, Filed Jul. 10, 2009.
Appendix C: Chart Comparing Claims 1, and 4-16 of the '413 to the teachings of the U.S. Patent No. 2,210,860 Issued to Regnell on Aug. 6, 1940 ("the Regnell Reference") Filed with the Corrected Request for Inter Partes Reexamination of U.S. Patent No. 7,481,413, Filed Jul. 10, 2009.
Appendix D: Chart Comparing Claims 1-16 of the 413 to the Teachings of U.S. Patent No. 2,210,860 Issued to Regnell in View of the U.S. Patent No. 5,730,415 Issued to Gronwick on Mar. 24, 1990 (the "Gronwick Reference") and Further in View of the American Society of Mechanical Engineers A112.19.14-2001 Issued Aug. 1, 2002 ("the ASME Reference"), Filed with the Corrected Request for Inter Partes Reexamination of U.S. Patent No. 7,481,413, Filed Jul. 10, 2009.
Appendix E: Chart Comparing Claims 1-16 of the '413 to the teachings of the U.S. Patent No. 1,912,937 Issued to George on Jun. 6, 1933, (the George Reference) Filed with the Corrected Request for Inter Partes Reexamination of U.S. Patent No. 7,481,413, Filed Jul. 10, 2009.
Appendix F: Chart Comparing Claims 1-16 of the '413 to the teachings of the George Reference in view of the American Society of Mechanical Engineers A112.19.14-2001 published Aug. 1, 2002), Filed with the Corrected Request For Inter Partes Reexamination Of U.S. Patent No. 7,481,413, Filed Jul. 10, 2009.
Appendix G: Chart Comparing Claims 1-16 of the '413 to the teachings of the U.S. Patent No 3,207,467 Issued to Buhler on Aug. 5, 1963 ("the Buhler Reference"). Filed with the Corrected Request For Inter Partes Reexamination of U.S. Patent No. 7,481,413, Filed Jul. 10, 2009.
Appendix H: Chart Comparing Claims 1-16 of the '413 to the teachings of the Buhler Reference in view of the U.S. Patent No. 5,730,415 Issued to Gronwick on Mar. 24, 1990 (the "Gronwick reference") and further in view of the American Society of Mechanical Engineers A112.19.14-2001 published Aug. 1, 2002 (the "ASME reference"); Filed with the Corrected Request For Inter Partes Reexamination of U.S. Patent No. 7,481,413, Filed Jul. 10, 2009.
First Office Action Issued by the U.S. Patent and Trademark Office for U.S. Appl. No. 95/001,187, Issued Aug. 21, 2009.
Owner's First Reply to Office Action, Filed Oct. 21, 2009.
Comments Under 37 C.F.R. §1.947 by Third Party Requestor to Patent Owner's Response in Inter Partes Reexamination of U.S. Patent No. 7,481,413 Filed Nov. 19, 2009.
Requestor Comments Appendix A: Chart Comparing Claims 1, 4-11, 14, and 16-71 of the '413 to the teachings of U.S. Patent No. 2,210,860 Issued to Regnell in view of the U.S. Patent No. 5,730,415 Issued to Gronwick on Mar. 24, 1990 and further in view of the American Society of Mechanical Engineers A112.19.14-2001 Published Aug. 1, 2002, Filed with First Requester Comments Nov. 19, 2009.

Requestor Comments Appendix B: Chart Comparing Claims 1, 4-11, 14, and 16-71 of the '413 to the teachings of the George Reference in view of the U.S. Patent No. 5,730,415 Issued to Gronwick on Mar. 24, 1990 and further in view of the U.S. Patent No. 5,730,415 Issued to Gronwick on Mar. 24, 1990 and further in view of the American Society of Mechanical Engineers A112.19.14-2001 Issued Aug. 1, 2002 (the "ASME reference"), Filed with First Requester Comments Nov. 19, 2009.

Requestor Comments Appendix C: Chart Comparing Claims 1, 4-11, 14, and 16-71 of the '413 to the teachings of the Buhler Reference U.S. Pat. No. 3,207,467 in view of the U.S. Patent No. 5,730,415 Issued to Gronwick on Mar. 24, 1990 (the "Gronwick reference") and further in view of the American Society of Mechanical Engineers A112.19.14-2001 published Aug. 1, 2002 (the "ASME reference"), Filed with First Requester Comments Nov. 19, 2009.

"Plaintiff Sloan Valve Company's Answer to Defendants Zurn Industries, Inc.'s and Zurn Industries, LLC's Second Amended Counterclaim", Filed Aug. 12, 2010, United States District Court for the Northern District of Illinois, Eastern Division.

Defendants Zurn Industries, Inc and Zurn Industries, LLC's Second Amended Answer, Counterclaims, and Affirmative Defenses to Plaintiff Sloan Valve Company's Complaint, Dated Jul. 20, 2010, United States District Court for the Northern District of Illinois, Eastern Division.

Restriction/election requirement Issued for U.S. Appl. No. 11/711,391, Issued Jun. 24, 2009.

Response to Restriction Requirement for U.S. Appl. No. 11/711,391, filed Jul. 23, 2009.

Office Action Issued for U.S. Appl. No. 11/711,391, Issued Oct. 28, 2009.

Response to Office Action for U.S. Appl. No. 11/711,391, filed Jan. 28, 2010.

Notice of Allowance for U.S. Appl. No. 11/711,391, Issued May 26, 2010.

Notice of Allowance for U.S. Appl. No. 11/711,391, Issued Sep. 17, 2010.

Request for Continued Application of U.S. Appl. No. 11/711,391, filed Aug. 25, 2010.

Request for Continued Application of U.S. Appl. No. 11/711,391, filed Dec. 17, 2010.

Japanese Patent Documents Produced During Discovery by Defendants Zurn Industries, Inc. and Zurn Industries, LLC, *Sloan Valve Co. v. Zurn Industries, Inc. et al.*, United States District Court for the Northern District of Illinois, Eastern Division, Case No. 1:10-cv-00204. No English translations were provided by Defendants.

Deposition Transcript of Mr. Matthew Martin, *Sloan Valve Co. v. Zurn Industries, Inc. et al.*, United States District Court for the Northern District of Illinois, Eastern Division, Case No. 1:10-cv-00204, Dated Aug. 11, 2010.

Deposition Transcript of Mr. Michael Rechtin, *Sloan Valve Co. v. Zurn Industries, Inc. et al.*, United States District Court for the Northern District of Illinois, Eastern Division, Case No. 1:10-cv-00204, Dated Aug. 12, 2010.

Deposition Transcript of Mr. Joel Bock, *Sloan Valve Co. v. Zurn Industries, Inc. et al.*, United States District Court for the Northern District of Illinois, Eastern Division, Case No. 1:10-cv-00204, Dated Aug. 13, 2010.

Deposition Transcript of Mr. Peter Jahrling, *Sloan Valve Co. v. Zurn Industries, Inc. et al.*, United States District Court for the Northern District of Illinois, Eastern Division, Case No. 1:10-cv-00204, Dated Oct. 11, 2010.

Deposition Transcript of Mr. Mark Gutting-Kilzer, *Sloan Valve Co. v. Zurn Industries, Inc. et al.*, United States District Court for the Northern District of Illinois, Eastern Division, Case No. 1:10-cv-00204, Dated Oct. 12, 2010.

Deposition Transcript of Mr. Daniel Carroll, *Sloan Valve Co. v. Zurn Industries, Inc. et al.*, United States District Court for the Northern District of Illinois, Eastern Division, Case No. 1:10-cv-00204, Dated Oct. 13, 2010.

Deposition Transcript of Mr. John Wilson, *Sloan Valve Co. v. Zurn Industries, Inc. et al.*, United States District Court for the Northern District of Illinois, Eastern Division, Case No. 1:10-cv-00204, Dated Oct. 14, 2010.

Deposition Transcript of Ms. Julie Shireman, *Sloan Valve Co. v. Zurn Industries, Inc. et al.*, United States District Court for the Northern District of Illinois, Eastern Division, Case No. 1:10-cv-00204, Dated Oct. 15, 2010.

Zurn Internal Email ZP002716, "Sloan Helps Reduce Operating Costs," Dated May 24, 2005. Document confidential, but released pursuant to De-designation Letter From the Webb Law Firm dated Dec. 29, 2010. De-designation Letter From the Webb Law Firm Releasing Confidential Documents, Dated Dec. 29, 2010.

Six-Liter Water Closets Equipped With a Dual Flushing Device, American Society of Mechanical Engineers, ASME A112.19.14-2006, Published Jul. 10, 2006.

"Dual Flush Devices for Water Closets," American Society of Mechanical Engineers, ASME A112.19.10-2003, Published Jul. 15, 2003.

"Dual Flush Devices for Water Closets," American Society of Mechanical Engineers, ASME A112.19.10-1994, Published 1994.

"Pressurized Flushing Devices (Flushometers) for Plumbing Fixtures," American Society of Sanitary Engineering, ASSE Standard #1037, Published Mar. 1990.

Defendants' responses to plaintiff's requests for admission Nos. 1-12, *Sloan Valve Co. v. Zurn Industries, Inc. et al.*, United States District Court for the Northern District of Illinois, Eastern Division, Case No. 1:10-cv-00204, Dated Apr. 22, 2010.

Defendants' Response to Plaintiff's Request for Production of Documents and Things Nos. 1-30, *Sloan Valve Co. v. Zurn Industries, Inc. et al.*, United States District Court for the Northern District of Illinois, Eastern Division, Case No. 1:10-cv-00204, Dated Apr. 28, 2010.

Defendants' Responses to Plaintiff's Requests for Admission Nos. 13-28, *Sloan Valve Co. v. Zurn Industries, Inc. et al.*, United States District Court for the Northern District of Illinois, Eastern Division, Case No. 1:10-cv-00204, Dated May 25, 2010.

Defendants' Supplemental Responses to Plaintiff's Request for Production of Documents and Things Nos. 1-30, *Sloan Valve Co. v. Zurn Industries, Inc. et al.*, United States District Court for the Northern District of Illinois, Eastern Division, Case No. 1:10-cv-00204, Dated May 26, 2010.

Defendants' Supplemental Responses to Plaintiff's Requests for Admission Nos. 1-12, *Sloan Valve Co. v. Zurn Industries, Inc. et al.*, United States District Court for the Northern District of Illinois, Eastern Division, Case No. 1:10-cv-00204, Dated May 26, 2010.

Defendants' Responses to Plaintiff's Requests for Admission Nos. 29-34, *Sloan Valve Co. v. Zurn Industries, Inc. et al.*, United States District Court for the Northern District of Illinois, Eastern Division, Case No. 1:10-cv-00201, Dated Jun. 2, 2010.

Plaintiffs Responses to Defendants' First Requests for Production of Documents and Things, *Sloan Valve Co. v. Zurn Industries, Inc. et al.*, United States District Court for the Northern District of Illinois, Eastern Divison, Case No. 1:10-cv-00204, Dated Jun. 4, 2010.

Plaintiffs Responses to Defendants' First Set of Requests for Admission, *Sloan Valve Co. v. Zurn Industries, Inc. et al.*, United States District Court for the Northern District of Illinois, Eastern Division, Case No. 1:10-cv-00204, Dated Jun. 9, 2010.

Defendants' Corrected Responses to Plaintiff's Requests for Admission Nos. 35-37, *Sloan Valve Co. v. Zurn Industries, Inc. et al.*, United States District Court for the Northern District of Illinois, Eastern Division, Case No. 1:10-cv-00204, Dated Jun. 18, 2010.

Defendants' Responses to Plaintiff's Requests for Production of Documents and Things Nos. 31-48, *Sloan Valve Co. v. Zurn Industries, Inc. et al.*, United States District Court for the Northern District of Illinois, Eastern Division, Case No. 1:10-cv-00204, Dated Jun. 29, 2010.

Defendants' First Supplemental Responses to Plaintiff's Interrogatories Nos. 11-13, *Sloan Valve Co. v. Zurn Industries, Inc. et al.*, United States District Court for the Northern District of Illinois, Eastern Division, Case No. 1:10-cv-00204, Dated Jul. 9, 2010.

Defendants' Supplemental Response to Plaintiff's Interrogatory No. 1, *Sloan Valve Co. v. Zurn Industries, Inc. et al.*, United States District Court for the Northern District of Illinois, Eastern Division, Case No. 1:10-cv-00204, Dated Aug. 12, 2010.

Defendants' Supplemental Responses to Plaintiff's Interrogatory Nos. 1 and 5, *Sloan Valve Co. v Zurn Industries, Inc. et al.*, United States District Court for the Northern District of Illinois, Eastern Division, Case No. 1:10-cv-00204, Dated Aug. 27, 2010.

Defendants' Supplemental Responses to Plaintiff's Requests for Production of Documents and Things Nos. 49-55, *Sloan Valve Co. v. Zurn Industries, Inc. et al.*, United States District Court for the Northern District of Illinois, Eastern Division, Case No. 1:10-cv-00204, Dated Aug. 27, 2010.

Defendants' Responses to Plaintiff's Requests for Production of Documents and Things Nos. 58-61, *Sloan Valve Co. v. Zurn Industries, Inc. et al.*, United States District Court for the Northern District of Illinois, Eastern Division, Case No. 1:10-cv-00204, Dated Aug. 31, 2010.

Defendants' Supplemental Response to Plaintiff's Interrogatory No. 1, *Sloan Valve Co. v. Zurn Industries, Inc. et al.*, United States District Court for the Northern District of Illinois, Eastern Division Case No. 1:10-cv-00204, Dated Sep. 1, 2010.

Plaintiffs Responses to Defendants' Second Set of Requests for Production of Documents and Things, *Sloan Valve Co. v. Zurn Industries, Inc. et al.*, United States District Court for the Northern District of Illinois, Eastern Division, Case No. 1:10-cv-00204, Dated Nov. 1, 2010.

Exhibits 1-19 to deposition of Matthew Martin, *Sloan Valve Co. v. Zurn Industries, Inc. et al.*, United States District Court for the Northern District of Illinois, Eastern Division, Case No. 1:10-cv-00204, Dated Aug. 11, 2010, Note: some exhibits have been redacted for confidentiality and are being submitted in a separate Information Disclosure Statement pursuant to MPEP § 724.

Exhibits 20-26 to deposition of Michael Rechtin, *Sloan Valve Co. v. Zurn Industries, Inc. et al.*, United States District Court for the Northern District of Illinois, Eastern Divison, Case No. 1:10-cv-00204, Dated Aug. 12, 2010, Note: some exhibits have been redacted for confidentiality are are being submitted in a separate Information Disclosure Statement pursuant to MPEP § 724.

Exhibits 27-34 to deposition of Joel Bock, *Sloan Valve Co. v. Zurn Industries, Inc. et al.*, United States District Court for the Northern District of Illinois, Eastern Division, Case No. 1:10-cv-002204, Dated Aug. 13, 2010.

Exhibits 35-53 to deposition of Peter Jahrling, *Sloan Valve Co. v. Zurn Industries, Inc. et al.*, United States District Court for the Northern District of Illinois, Eastern Division, Case No. 1:10-cv-00204, Dated Oct. 11, 2010.

Exhibits 54-65 to deposition of Mark Gutting-Kilzer, *Sloan Valve Co. v. Zurn Industries, Inc. et al.*, United States District Court for the Northern District of Illinois, Eastern Division, Case No. 1:10-cv-00204, Dated Oct. 12, 2010.

Exhibits 66-71 to deposition of Daniel Carroll, *Sloan Valve Co. v. Zurn Industries, Inc. et al.*, United States District Court for the Northern District of Illinois, Eastern Division, Case No. 1:10-cv-00204, Dated Oct. 13, 2010.

Exhibits 72-88 to deposition of John Wilson, *Sloan Valve Co. v. Zurn Industries, Inc. et al.*, United States District Court for the Northern District of Illinois, Eastern Division, Case No. 1:10-cv-00204, Dated Oct. 14, 2010.

Exhibits 89-108 to Depostion of Julie Shireman, *Sloan Valve Co. v. Zurn Industries, Inc. et al.*, United States District Court for the Northern District of Illinois, Eastern Division, Case No. 1:10-cv-00204, Dated Oct. 15, 2010.

Exhibits 109-143 to deposition of Jim Allen, *Sloan Valve Co. v. Zurn Industries, Inc. et al.*, United States District Court for the Northern District of Illinois, Eastern Division, Case No. 1:10-cv-00204, Dated Nov. 12, 2010.

Photographs of Coyne & Delany foot-activated "Flushboy" flush valve taken on Apr. 21, 2010, Bates No. SVC0011766-SVC0011798, manufactured by Coyne & Delany Products, Charlottesville, Virginia, alleged to be prior art by Defendants, date of manufacture unknown, *Sloan Valve Co. v. Zurn Industries, Inc. et al.*, United States District Court for the Northern District of Illinois, Eastern Division, Case No. 1:10-cv-00204.

Photographs of Sloan long flush valve handle (handle mislabeled in photograph as worn Zurn flush valve) taken on Apr. 21, 2010, Bates No. SVC0011799-SVC0011818, *Sloan Valve Co. v. Zurn Industries, Inc. et al.*, United States District Court for the Northern District of Illinois, Eastern Division, Case No. 1:10-cv-00204.

Photographs of Sloan short flush valve handle taken on Apr. 21, 2010, Bates No. SVC0011819-SVC0011843, *Sloan Valve Co. v. Zurn Industries, Inc. et al.*, United States District Court for the Northern District of Illinois, Eastern Division, Case No. 1:10-cv-00204.

Photographs of simulated worn Zurn flush valve handle with brass bushing, created by Zurn circa 2008-2009, Bates No. SVC0011844-SVC0011881, *Sloan Valve Co. v. Zurn Industries, Inc. et al.*, United States District Court for the Northern District of Illinois, Eastern Division, Case No. 1:10-cv-00204.

Photographs of new Zurn flush valve handle with brass bushing taken on Apr. 21, 2010, Bates No. SVC0011882-SVC0011891, *Sloan Valve Co. Zurn Industries, Inc. et al.*, United State District Court for the Northern District of Illinois, Eastern Division, Case No. 1:10-cv-00204.

Photographs of new Zurn flush valve handle with plastic bushing taken on Apr. 21, 2010, Bates No. SVC0011892-SVC0011898, *Sloan Valve Co. v. Zurn Industries, Inc. et al.*, United States District Court for the Northern District of Illinois, Eastern Division, Case No. 1:10-cv-00204.

Photograph comparing Sloan short flush valve handle to Sloan long flush valve handle taken on Apr. 21, 2010, Bates No. SVC0011763, *Sloan Valve Co. v.Zurn Industries, Inc. et al.*, United States District Court for the Northern District of Illinois, Eastern Division, Case No. 1:10-cv-00204.

Photographs showing side-by-side comparison of "worn Zurn flush valve handle with brass bushing" to "new Zurn flush valve handle with plastic bushing" and "new Zurn flush valve handle with brass bushing" taken Apr. 21, 2010, Bates No. SVC0011760-SVC0011762, SVC0011764 and SVC0011765 *Sloan Valve Co. v. Zurn Industries, Inc. et al.*, United States District Court for the Northern District of Illinois, Eastern Division, Case No. 1:10-cv-00204.

Order regarding Sloan's Motion to Dismiss, *Sloan Valve Co. v. Zurn Industries, Inc. et al.*, 712 F. Supp. 2d 743 (N.D. Ill. 2010), May 6, 2010, *Sloan Valve Co. v. Zurn Industries, Inc. et al.*, United States District Court for the Northern District of Illinois, Eastern Division, Case No. 1:10-cv-00204.

Zurn's Amendment and Request for Interference Under 37 C.F.R. 41.202, Filed Oct. 26, 2010.

Video of Sloan expert's inspection and flush volume testing of Zurn worn flush valve, Dated Dec. 9, 2010, Bates No. SVC0318206, *Sloan Valve Co. v. Zurn Industries, Inc. et al.*, United States District Court for the Northern District of Illinois, Eastern Division, Case No. 1:10-cv-00204.

Coordinate measuring machine rendering of Zurn worn flush valve bushing bore performed by Sloan expert, Dated Dec. 9, 2010, Bates No. SVC0318174, *Sloan Valve Co. v. Zurn Industries, Inc. et al.*, United States District Court for the Northern District of Illinois, Eastern Division, Case No. 1:10-cv00204.

Notes from Sloan expert's inspection and flush volume testing of Zurn worn flush valve, Dated Dec. 9, 2010, Bates No. SVC0318175, *Sloan Valve Co. v. Zurn Industries, Inc. et al.*, United States District Court for the Northern District of Illinois, Eastern Division, Case No. 1:10-cv-00204.

Photographs from Sloan expert's inspection and replication of Zurn worn flush valve bushing bore, Dated Feb. 16-18, 2011, Bates Nos. SVC0318183-SVC0318205, *Sloan Valve Co. v. Zurn Industries, Inc. et al.*, United States District Court for the Northern District of Illinois, Eastern Division, Case No. 1:10-cv-00204.

\* cited by examiner

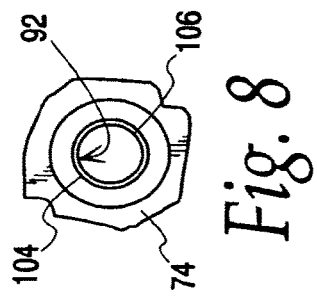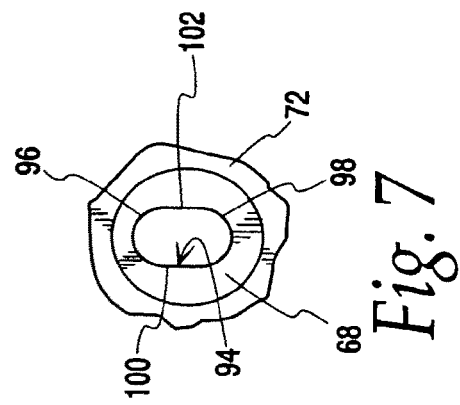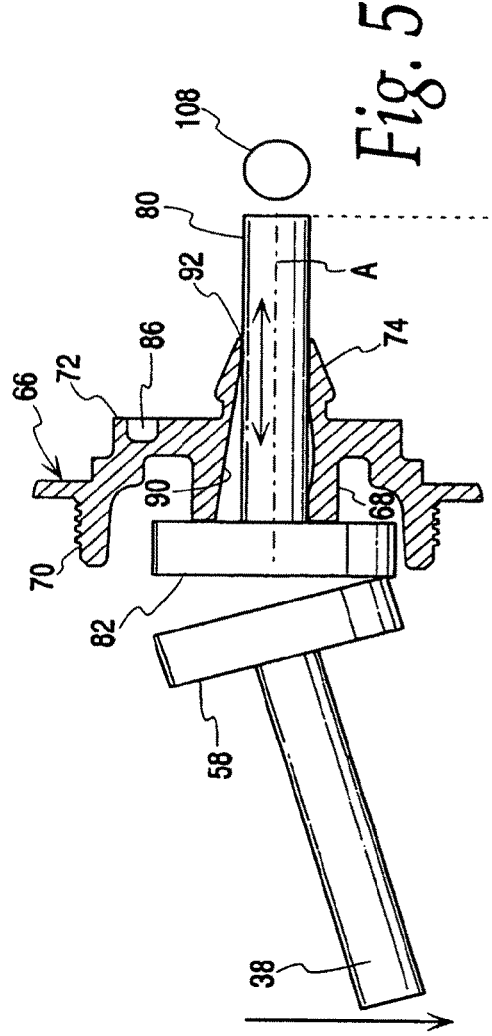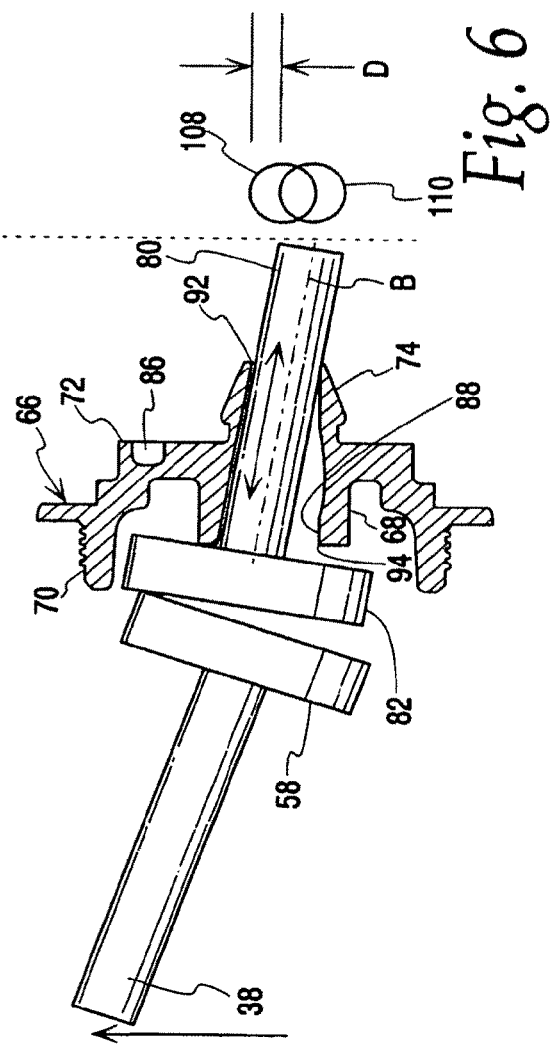

FLUSH VALVE HANDLE ASSEMBLY PROVIDING DUAL MODE OPERATION

CROSS-REFERENCE TO RELATED PATENT APPLICATION

This application is a Divisional Application of U.S. patent application Ser. No. 11/211,273, filed Aug. 25, 2005, now U.S. Pat. No. 7,607,635, incorporated herein by reference in its entirety.

BACKGROUND OF THE INVENTION

The present invention relates to flush valves for use with plumbing fixtures such as toilets, and more specifically to improvements in the bushing of the actuating handle assembly that will provide for user-selectable, dual mode operation of the flush valve.

Conservation of water resources in the use of toilets can be achieved by allowing a user to select that volume of water required to clean the fixture. For liquid waste a reduced flush volume is adequate. For solid waste a full flush is necessary. Based on the user's determination of whether a larger or smaller flush volume is appropriate to clean the bowl, a flush valve can be operated to provide a larger or smaller volume. Flush valves of this type can be designated dual mode flush valves.

The prior art includes dual mode flush valves. U.S. Pat. No. 2,738,946 has a handle assembly which allows a user to choose either a low volume flush or a full volume flush depending on the axial direction of handle activation. The flush handle assembly includes a plunger having a U-shaped member attached to the inner end thereof. The U-shaped member surrounds the bottom of the relief valve sleeve with legs which, have different lengths. Upon activation of the handle one of the U-shaped member's legs will engage the relief valve sleeve and unseat the relief valve. The resulting upward movement of the relief valve will cause the sleeve to clear the leg of fee U-shaped member and reseat. Reseating will happen at different times due to the different lengths of the legs. Accordingly, the relief valve reseats either later or sooner depending on which leg engaged the sleeve. Timing of the relief valve closure is one of the factors which governs the length of time the flush valve is open. Therefore the relief valve closure can be used to control how much water flows through the valve during a flush. In this construction the plunger moves only along a horizontal axis regardless of how the handle is actuated. Also, pushing or pulling the handle in a horizontal plane will not activate the valve.

Another attempt to create a dual mode flush valve is shown in U.S. Pat. No. 4,134,570. This valve shows various ways to limit the actuating handle movement, with the intent of limiting the amount of horizontal plunger travel when the user wants to select the minimum flush volume. However, there is no provision for altering the relief valve reseating time. Whether the relief valve sleeve is tilted a small or large amount, the relief valve still cannot reseat until either the diaphragm lifts the sleeve clear of the plunger or the user releases the handle. Therefore, this construction will either fail in practice to produce significant differences in flow volumes or the flow volume will depend on how quickly the user releases the actuating handle. The latter will result in variable and unpredictable flush volumes or incomplete opening of the valve.

SUMMARY OF THE INVENTION

The present invention is directed to a dual mode flush valve which allows the user to select the amount of water that will flow, depending on the amount of water required to clean a fixture. Except For the handle bushing and socket the valve may be conventional. It includes a valve body with an inlet and outlet and a valve seat between the inlet and outlet. A valve member is movable in and oat of engagement with the valve seat to open and close the valve. A pressure chamber defined between the valve member and the top of the valve body controls opening and closing, of the valve member. A relief valve mounted on the valve member opens and closes the pressure chamber. The relief valve includes astern and sleeve mounted in telescoping relation. These extend to a point where at least the sleeve is adjacent to a plunger that is actuated by a handle mounted to the valve body.

The plunger is mounted in a bushing. The bushing has a sleeve with a passage defined therein. The plunger extends through the passage. The sleeve has an inner end and an outer end. The passage is defined by first and second bores which partially overlap. The bores coincide at the inner end of the sleeve but are spaced one above the other at the outer end of the sleeve. Thus, the passage has a generally circular opening at the inner end and a somewhat oval shape at the outer end of the sleeve. The bores define a horizontal axis of plunger travel and an angled axis of plunger travel. In a preferred embodiment the angled axis is In a vertical plane with the outer end of the bore at a higher elevation than the inner end of the bore. Thus, when the plunger travels along the angled axis the tip of the plunger contacts the relief valve sleeve at a lower point than is the ease when the plunger travels along the horizontal axis. The lower point of contact allows the relief valve sleeve to clear the plunger sooner, resulting in earlier closure of the relief valve and reduced open time for the valve, which of course means a reduced flow amount through the valve.

The flush volumes are selected by choosing the direction of handle actuation. Actuation in an upward vertical, direction will tilt the plunger up and cause it to travel on the angled plunger travel axis. This reduces flow as just described. Actuation of the handle in any other direction will not tilt the plunger and it will move in the horizontal axis, resulting in a full flush cycle.

The handle assembly includes a socket that is engageable with the valve body of the flush valve. The socket includes an exterior portion that is visible on the exterior of the valve body when the handle assembly is installed on the valve body. Since the conventional handle assembly is symmetrical about the plunger axis, the handle assembly can be installed on the valve body in any orientation without affecting its performance. However, in the preferred embodiment of the present invention, the handle assembly is not symmetrical about the plunger axis. Instead it has to be installed in a particular orientation for it to perform as intended. The problem is the non-symmetrical portion of the handle assembly is not visible to the installer. Accordingly, in one aspect the present invention provides a mark on the visible portion of the socket that indicates to the installer where the non-symmetrical portion of the bushing passage is. This allows the installer to properly orient the bushing relative to the valve body.

One of the advantages of the present invention is that it allows a user to conserve water while the bushing is compatible with existing valves. Another advantage is it permits the valve to be actuated by pushing or pulling the handle in any direction, which is what most users are accustomed to. Only actuation in a particular direction will result in a reduced flush, but all other directions are still available for a normal or full volume flush. The present invention also utilizes the inherent static Forces internal to the handle assembly during activation to bias the plunger's transverse direction. A further advantage of the invention is it uses the existing plunger seat.

The bushing geometry where the seal is located is the same as the standard bushing. The plunger traveling, on the angled axis will slightly tilt the existing plunger seal but not sufficiently to adversely affect it.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 5 is a schematic sectional representation of the handle bushing of the present invention, showing the handle and plunger travel for a full flush.

FIG. 6 is a schematic sectional representation of the handle bushing of the present invention, showing the handle and plunger travel for a partial or reduced volume flush.

FIG. 7 is a schematic end elevation view of the outer end of the handle bushing's sleeve, illustrating the shape of the passage opening at the outer end.

FIG. 8 is a schematic end elevation view of the inner end of the handle bushing's sleeve, illustrating the shape of the passage opening at the inner end.

DETAILED DESCRIPTION OF THE INVENTION

Figure 1:
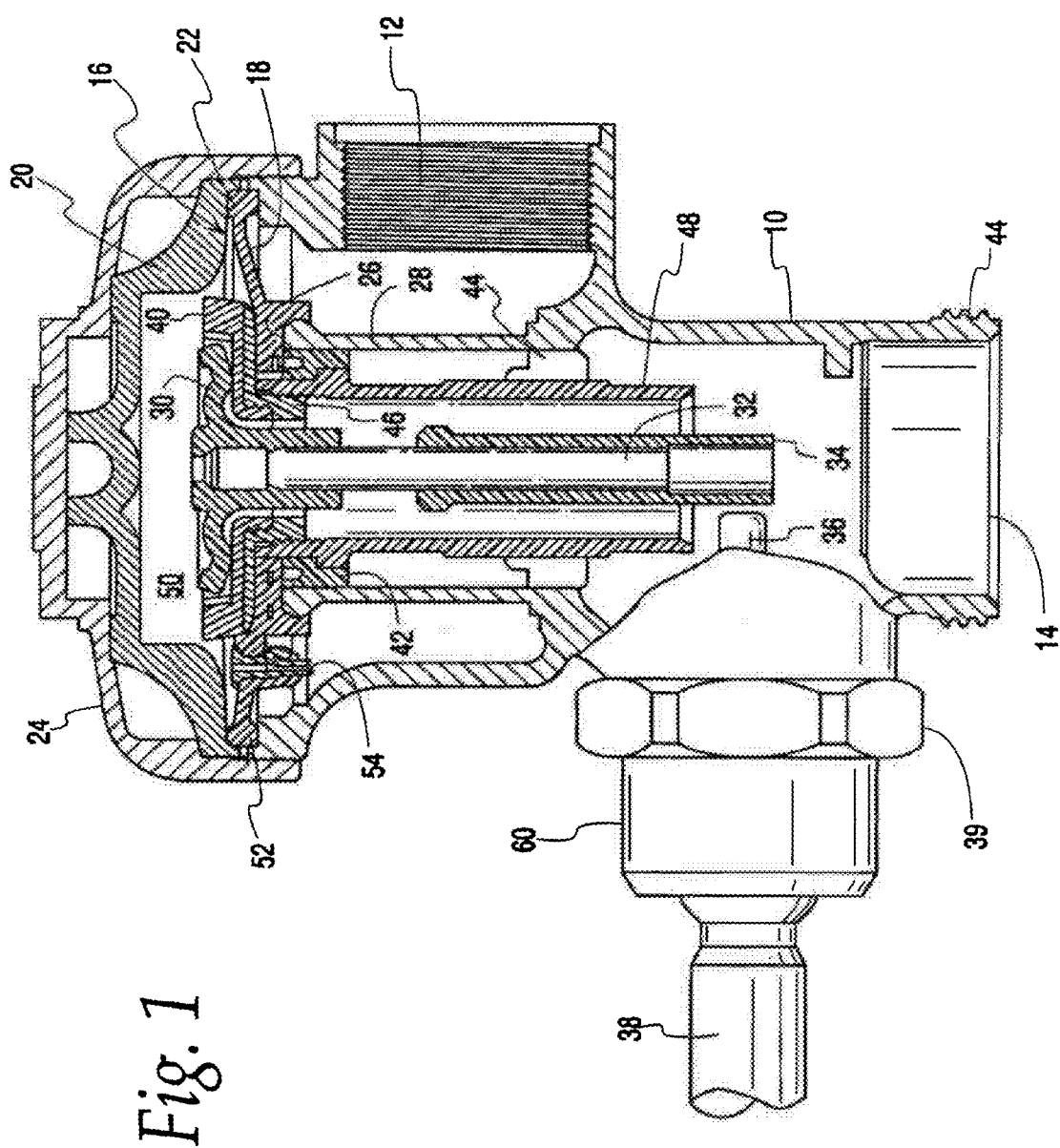
FIG. 1 is a partial section through a flush valve body.

The flush valve of the present invention includes a body 10 having an inlet 12 and an outlet 14. When installed the inlet is connected to a water supply and the outlet is connected to a fixture such as a toilet or urinal. A valve member is indicated generally at 16. In the illustrated embodiment the valve member is a diaphragm assembly but it could be otherwise, such as a piston assembly. The valve member includes a diaphragm 18 peripherally held to the body 10 by an inner cover 20. The diaphragm is seated upon a shoulder 22 at the upper end of body 10 and the peripheral edge 52 of the diaphragm is clamped in this position by the inner cover 20. An outer coyer 24 is screw threaded onto the body to hold the inner cover in position.

The diaphragm assembly 16, as shown in FIG. 1, is closed upon a valve seat 26 formed at the upper end of a barrel 28. The barrel 28 forms the fluid conduit connecting the valve seat with outlet 14. The diaphragm assembly 16 includes a relief valve 30 having a downwardly extending stem 32 telescopic-ally carrying a movable sleeve 34. Sleeve 34 is positioned for contact by a plunger 36 when operated by a handle 38. The handle 38 is part of a handle assembly which will be described in further detail below. The handle assembly is retained on the valve body by a nut 39.

The diaphragm assembly 16, in addition to diaphragm 18 and the relief valve 30, includes a retaining disk 40, a refill ring 42 and a flow control ring 44. The underside of the retaining disk 40 is threadedly attached to a collar 46, which in turn is threadedly attached at its exterior to a sleeve 48 which carries the refill ring 42. The above described assembly of elements firmly holds the diaphragm 18 between the upper face of the refill ring 42 and a lower facing surface of the collar 46. Above the diaphragm assembly 16 is a pressure chamber 50 which maintains the diaphragm assembly in a closed position when the flush valve is not in use.

As is known in the art, when fee handle 38 is operated, the plunger 36 will contact sleeve 34, tilting the relief valve 30 off its seat on the retaining: disk 40. This will permit the discharge of water within the pressure chamber 50 down through the sleeve 48. Inlet pressure will then cause the diaphragm to move upwardly off its seat 26, permitting direct commumcation between the inlet 12 and the outlet 14 through the space between the bottom, of the diaphragm assembly and the seat 26. The raising of the diaphragm 16 also lifts the relief valve sleeve 34, allowing it to clear the plunger 36 even if the user has held the handle 38 in an actuated position. Once the sleeve clears the plunger the relief valve reseats on the retaining disk 40. As soon as this operation has taken place, the pressure chamber 50 will begin to fill through the filter and bypass orifice 54 in the diaphragm assembly. As flow continues into the pressure chamber 50, the diaphragm assembly will move back down toward its valve seat 26 and when it has reached that position, the flush valve will be closed.

Figure 2:
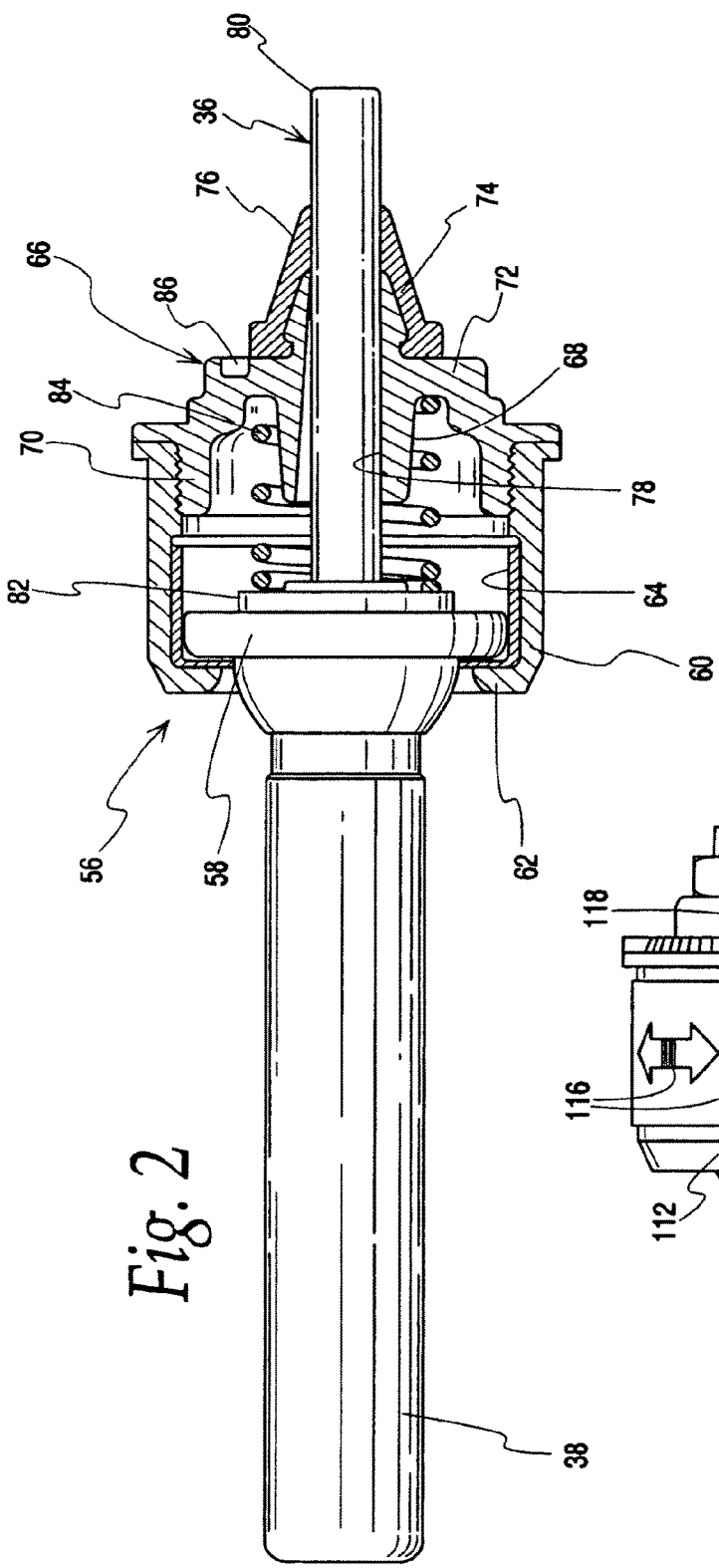
FIG. 2 is a section through a handle assembly of the present invention.
Figure 4:
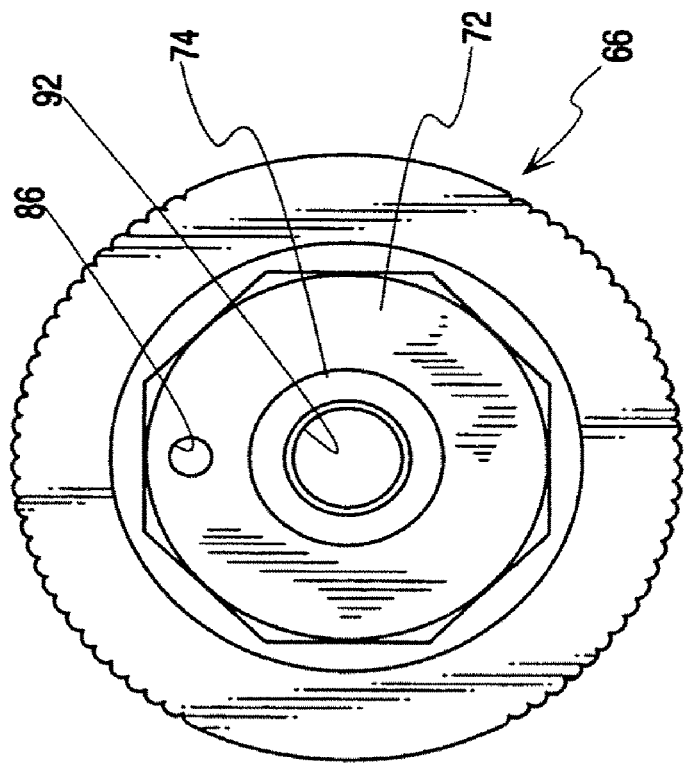
FIG. 4 is a right end elevation view of the handle bushing.
Figure 3:
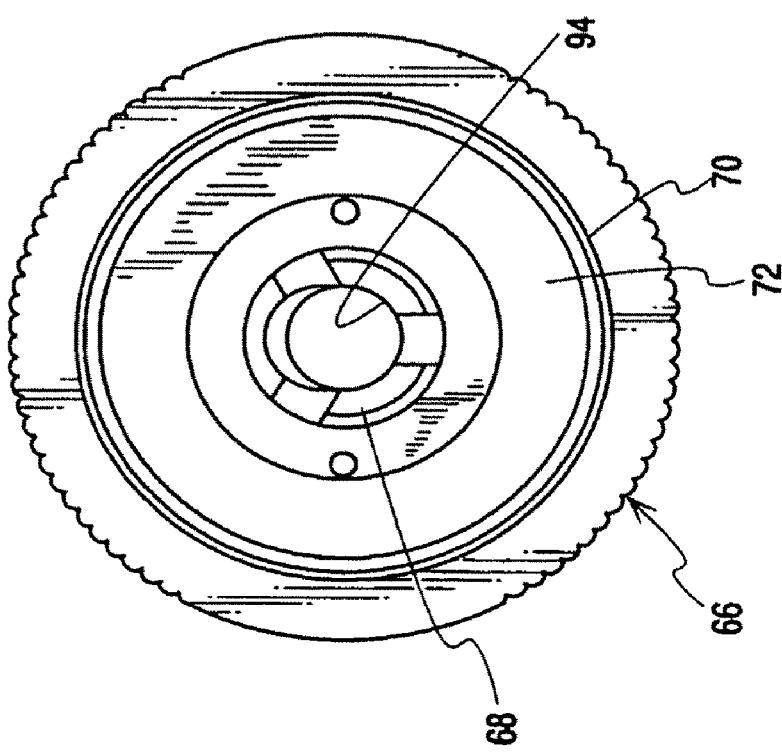
FIG. 3 is a left end elevation view of the handle bushing.

FIGS. 2-4 illustrate the handle assembly 56 of the present invention. The handle assembly fits through an opening in the valve body and is retained therein by the nut 39 (FIG. 1) in the conventional manner. The handle assembly includes the handle 38 which has a face plate 58 at its inner end. The face plate is held within a chamber formed by a handle socket 60. An inwardly extending flange 62 on the socket's outer end retains the handle face plate 58. A sleeve 64 may line the socket chamber and flange 62. The inner end of the socket is threaded to the bushing 66 of the present invention. The bushing has a central sleeve 68 and an outer skirt 70 joined by a wail 72. The skirt 70 is threaded to the socket 60. The inner end of the sleeve has a beveled nose 74 that mounts a handle packing or seal 76. The sleeve has a passage 78 there through that receives the shank 80 of the plunger 36. Further details of the passage 78 will be described below. There is a head 82 on the outer end of the plunger shank. The head 82 engages the face plate 58 of the handle. A compression spring 84 or other suitable biasing device fits between the bushing and the head 82 to urge the plunger into engagement with the face plate 58 of handle 38. The wall 72 may also have an indicia thereon which indicates which side of the bushing has the angled axis. The indicia may be in the form of a depression 86 in the wall. Other markings are possible. This will assist the installer in orienting the bushing properly.

Turning now to FIGS. 5-8, details of the bushing's passage 78 are shown. The passage can he considered to be defined by first and second bores 88 and 90 extending through the sleeve 68. The bores are preferably centered on the same vertical plane. The first bore 88 is horizontal and defines a horizontal plunger travel axis A. The second bore 90 is not horizontal it is tilted upwardly at the outer end of the sleeve and defines an angled plunger travel axis B. The second bore can be considered a tilt portion of the bushing passage 78. The bores preferably each have a diameter slightly greater than that of the plunger shank 80. The bores overlap and merge together at the inner end of the sleeve so that they define a substantially circular opening 92 at the inner end. At the outer end of the sleeve the second bore 90 is above the first bore 88. As seen in FIG. 7, the opening 94 at the outer end of the sleeve includes an upper arcuate portion 96, a lower arcuate portion 98, and a pair of extension portions 100 and 102 joining the upper and lower arcuate portions. The result is a somewhat oval, although not strictly elliptical, shaped opening 94. As seen in FIG. 8, the opening 92 at the inner end of the sleeve includes an upper arcuate portion 104, a lower arcuate portion 106. In a preferred embodiment the height of the extension portions at the opening has shrunk to essentially zero so the arcuate portions 104 and 106 join one another.

It can be seen that the diameter of the plunger is just slightly less than that of the inner opening 92. Thus, the plunger can slide and tilt freely in the opening 92 but it cannot move up, down or sideways appreciably. This contrasts with the opening 94 which permits appreciable up and down movement of the plunger at that point. The result of the combination of the two sleeve bores and their openings is the plunger can tilt up and down as well as slide axially.

The operation of the handle assembly will now be described. FIG. 5 shows the handle in an actuated position where it has been moved down by a user. Downward movement of the handle causes the face plate 58 to pivot about the upper portion of plate (which remains in contact with the socket flange 62) with the lower portion of plate 58 moving to the right, as seen in FIG. 5. This places a force $F_{handle}$ on the lower portion of the plunger head 82. With the noted forces $F_{bushing}$ on the plunger, the plunger remains centered on the horizontal plunger travel axis A. A diagrammatic end view of the plunger shank is shown at 108. FIG. 6 shows the handle in an actuated position where it has been moved up by a user. Upward movement of the handle causes the face plate 58 to pivot about the lower portion of plate with the upper portion of plate 58 moving to the right, as seen in FIG. 6. This places a force $F_{handle}$ on the upper portion of the plunger head 58. With the noted forces $F_{bushing}$ on the plunger, the plunger tilts upward at the left end and downward at the right end, taking the plunger into the second bore 90 where it is aligned with the angled plunger travel axis B. This lowers the inner tip of the plunger. A diagrammatic end view of the plunger tip when on axis B is shown at 110 in FIG. 6. The end view of plunger tip 108 on the horizontal axis A is also represented in FIG. 6 to illustrate the vertical drop D of the plunger tip on axis B as compared to when the plunger travels on axis A.

It can be appreciated by looking at FIG. 1 that dropping the plunger tip to position 1-10 by angling the plunger shank will permit the sleeve 34 of the relief valve to clear the plunger tip sooner than is the case when the plunger travels on the horizontal axis and the tip is at position 108. As a result of the earlier plunger clearance, the relief valve 30 closes sooner. This allows reestablishment of the pressure in chamber 50 sooner, resulting in earlier closure of the diaphragm and lesser volume per flush cycle. So when the user pushes the handle 38 upwardly, the plunger will be angled downwardly and there will be a reduced flush. When the user pushes the plunger in any direction but up, the plunger will move on the horizontal axis and the full volume flush will result.

Alternate configurations of the bushing passage are possible. For example, instead of having the widened opening of the passage at the outside end of the sleeve, it could be at the inner end. Or, instead of having the lowermost edge of the passage be horizontal and the uppermost edge be angled as shown, this arrangement could be reversed. A further alternative is to provide a sleeve passage with a horizontal axis and an angled axis wherein the inner end of the plunger is angled above horizontal. In that ease the horizontal travel, caused by an upward actuation of the handle, would provide the lower flush volume. Similarly, the upwardly angled travel, caused by a downward actuation of the handle, would provide the higher volume flush. Some shortening of the relief valve sleeve might be needed in conjunction with this setup. Yet another possible alternate construction of the bushing, passage is to make the inside diameter of the bushing passage appreciably larger than the outside diameter of the plunger. This would cause the plunger to tilt somewhat no matter which direction the handle is actuated, but only tilting in the vertical, plane would affect the volume of the flush.

Figure 9:
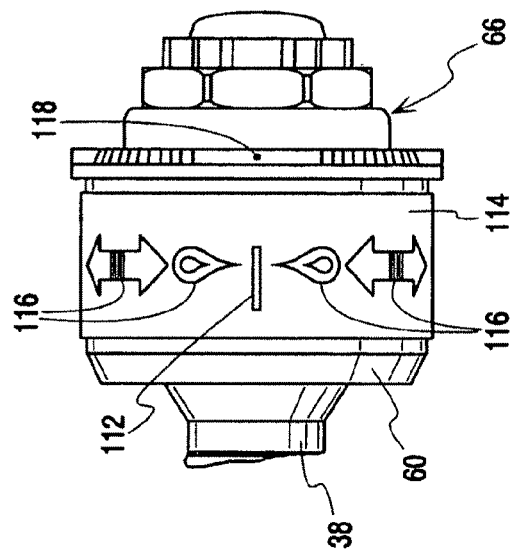
FIG. 9 is a plan view of an alternate embodiment of the socket, with remaining portions of the handle assembly broken away, showing the mark indicating the location of the tilt portion of the bushing passage.

FIG. 9 illustrates yet another feature of the present invention. As will be evident from the above description, the second bore 90 provides a tilt portion of the bushing passage 78. This produces a non-symmetrical configuration of the passage, as compared to having only a simple, single horizontal bore at 88. This can be seen in FIG. 7. In order to provide the vertical plunger tip drop D illustrated in FIG. 6 with the attendant lower flush volume, the bushing 66 must be installed on the valve body such that the first and second bores 88, 90 are oriented in a generally vertical plane with the second bore 90 on top. However, since the bores are in the interior of the bushing an installer can see neither the bores nor the indicia 86 once the bushing goes into the valve body. The present invention solves this, problem by providing an externally-visible mark or indicator 112 showing the location of the second bore. In the illustrated embodiment the mark is simply a line which may be suitably printed on a label that is attached to the exterior portion 114 of the socket 60. The label may optionally carry additional graphics 116 to instruct the user regarding the availability of the reduced flush alternative. Instead of a label the mark 112 could be engraved or otherwise formed directly on the socket. The mark 112 can be used in conjunction with the indicia 86 on the bushing 66. That is, at the time of installation of the handle assembly on to the valve body, the installer can look to ensure that the mark 112 is rotationally aligned with the indicia 86 and then make sure that the mark 112 is at the top of the handle assembly when the nut 39 is tightened. This will result, in the bushing passage 78 having the proper orientation relative to the valve body 10 and relief valve sleeve 34. Further assurance of proper alignment may be added by placing a flat 118 on the external flange of the bushing. Aligning the mark 112 with the flat 116 during assembly of the handle and then placing the mark at the top of the handle during installation of the handle assembly will result in the correct orientation.

While the preferred form of the invention has been shown and described herein, it should be realized that there may be-many modifications, substitutions and alterations thereto. For example, the arcuate portions 96 and/or 98 may be fully semi-circular or they could extend somewhat less than a full 180°. Also, while a circular cross section for the plunger shank and the opening 92 is preferred, it could be otherwise so long as the plunger is free to slide.

I claim:

1. A bushing for a handle assembly for a dual mode flush valve, the bushing comprising:
   a sleeve having inner and outer ends,
   a passage through the sleeve, the passage defining a first opening at the outer end of the sleeve and a second opening at the inner end of the sleeve, and
   one of said openings having a lower arcuate portion, an upper arcuate portion and a pair of extension portions joining the upper and lower arcuate portions, the other of said openings having a lower arcuate portion and an upper arcuate portion substantially joined to one another;
   wherein the passage is configured to receive a plunger, the passage having a first axis of plunger travel associated with a first flush volume required for removal of solid waste and a second axis of plunger travel associated with a second flush volume adequate for removal of liquid waste, the first axis and the second axis being non-parallel wherein the passage provides for movement of the plunger between the first axis of plunger travel and the second axis of plunger travel.

2. The bushing of claim 1 wherein the length of the pair of extension portions reduces uniformly from a maximum at said one opening to substantially zero at the other of said openings.

3. The bushing of claim 1 wherein said one opening is at the outer end of the sleeve and said other opening is at the inner end of the sleeve.

4. The bushing of claim 1, wherein the passage is nonsymmetrical about a horizontal plane.

5. In a flush valve having a bushing for a handle assembly in the flush valve, the improvement comprising a bushing in the flush valve with a passage of the bushing having inner and outer ends, the passage defining a first opening at the outer end of the sleeve and a second opening at the inner end of the sleeve, one of said openings having a lower arcuate portion, an upper arcuate portion and a pair of extension portions joining the upper and lower arcuate portions, the other of said openings having a lower arcuate portion and an upper arcuate portion substantially joined to one another, the bushing thereby enabling operation of the handle assembly to release at least two different flush volumes of water from the flush valve and enabling removal of solid waste by a required first flush volume and removal of liquid waste by an adequate second flush volume.

6. The flush valve of claim 5 wherein the length of the extension portion reduces uniformly from a maximum at said one opening to substantially zero at the other of said openings.

7. The flush valve of claim 6 wherein said one opening is at the outer end of the passage and said other opening is at the inner end of the passage.

8. The flush valve of claim 5 wherein the passage is configured to receive a plunger, the passage having a first axis of plunger travel and a second axis of plunger travel, the first axis and the second axis being non-parallel wherein the passage provides for movement of the plunger between the first axis of plunger travel and the second axis of plunger travel.

9. The flush valve of claim 5, wherein the passage is nonsymmetrical.

10. A dual mode flush valve handle assembly, comprising:
a handle, a plunger, a handle socket and a bushing removably affixable to the handle socket, the handle tiltable relative to the handle socket and the bushing,
a non symmetrical passage through the bushing, the passage defining a first opening and a second opening and a first axis and a second axis,
one of said openings having a lower arcuate portion, an upper arcuate portion and apair of extension portions joining the upper and lower arcuate portions, the other of said openings having a lower arcuate portion and an upper arcuate portion substantially joined to one another, the passage having a horizontal axis of plunger travel and an angled axis of plunger travel;
the plunger at least partially slidable through and tiltable within the passage,
wherein actuation of the handle in a first direction will result in the plunger traveling along the angled axis of plunger travel and actuation of the handle in a second direction will result in the plunger traveling along the horizontal axis of plunger travel.

11. The flush valve handle assembly of claim 10 wherein the length of the extension portion reduces uniformly from a maximum at said one opening to substantially zero at the other of said openings.

12. The flush valve handle assembly of claim 11 wherein said one opening is at an outer end of the passage and said other opening is at an inner end of the passage.

13. The flush valve handle assembly of claim 10 wherein the passage is configured to receive a plunger, the passage having a first axis of plunger travel and a second axis of plunger travel, the first axis and the second axis being non-parallel wherein the passage provides for movement of the plunger between the first axis of plunger travel and the second axis of plunger travel.

14. A flush valve handle assembly for a dual mode flush valve, comprising:
a plunger and a bushing, the bushing including a housing having a passage there through with a first opening at a first end of the bushing and a second opening at a second end of the bushing the passage connecting the first and second openings to form a path through the bushing; the passage having a nonsymmetrical shape about a horizontal axis;
the passage having a first axis of plunger travel and a second axis of plunger travel, the first axis and the second axis being non-parallel wherein the passage provides for movement of the plunger between the first axis of plunger travel and the second axis of plunger travel.

15. The flush valve handle assembly of claim 14 wherein the length of the extension portion reduces in a manner selected from the group of (a) uniformly from a maximum at said one opening to substantially zero at the other of said openings (b) having a recessed portion along the length.

16. The flush valve handle assembly of claim 15 wherein said one opening is at the outer end of the passage and said other opening is at the inner end of the passage.

17. In a user actuated water flush valve with a body having an inlet and an outlet, a valve seat between the inlet and outlet, a valve member movable to a closing position on the valve seat to control water flow between the inlet and outlet, a pressure chamber defined in the body above the valve member, a relief valve mounted on the valve member for movement between seated and unseated positions which close and open the pressure chamber, respectively, a user actuable valve activation component coupled to the body, a bushing having a passage defined therethrough and a plunger mounted in the bushing passage, the improvement comprising,
the plunger being slidably and tiltably mounted in the bushing and having an outer end in engagement with the valve activation component and an inner end engageable with the relief valve, the plunger being movable to unseat the relief valve, the bushing passage defining both a first axis of plunger travel corresponding to release of a first flush volume required for removal of solid waste and a second axis of plunger travel which is angled with respect to the first axis of plunger travel and corresponding to release of a second flush volume adequate for removal of liquid waste, wherein the first flush volume arises from a user selected first movement of the valve activation component to cause sliding of the plunger along the first axis of plunger travel and the second flush volume arises from a user selected second movement of the valve activation component to cause sliding along the second axis of plunger travel, thereby enabling user selection of one of the first flush volume and the second flush volume for a dual mode flush valve.

18. In a flush valve system having a bushing and associated handle assembly in the flush valve system and the flush valve system adapted for providing at least two different flush volumes of water by selective displacement by a user of the handle assembly in different particular directions with each of the directions associated with one of the at least two different flush volumes of water being selectable as indicated by a user visible indicia on the flush valve assembly, the improvement comprising a bushing in the flush valve with a passage of the bushing having an inner end and an outer end, the passage defining a first opening at an outer end of the passage and a second opening at an inner end of passage, one of said openings having a lower arcuate portion, an upper arcuate portion and a pair of extension portions joining the upper and lower arcuate portions, the other of said openings having a lower arcuate portion and an upper arcuate portion substantially joined to one another, the bushing thereby enabling operation of the handle assembly to controllably release the at least two different flush volumes of water from the flush valve.

19. In a flush valve having a bushing for a handle assembly in the flush valve, the improvement comprising a bushing in the flush valve with a passage of the bushing having inner and outer ends, the passage defining a first opening at the outer end of the sleeve and a second opening at the inner end of the sleeve, one of said openings having a lower arcuate portion, an upper arcuate portion and a pair of extension portions joining the upper and lower arcuate portions, the other of said openings having a lower arcuate portion and an upper arcuate portion substantially joined to one another, the bushing having a recessed portion disposed along the passage;

the bushing thereby enabling operation of the handle assembly to selectively release either a first volume of water required for removal of solid waste by a required first flush volume or a second volume of water adequate for liquid waste removal.

20. A handle assembly for attaching to a water flush valve body, said handle assembly comprising:

a handle engageable with a socket;

a bushing having a passage therethrough, the passage having a first wall portion and a second wall portion;

a plunger mounted in the passage, the handle causing the plunger to slide along the first wall portion when the handle is actuated in the first direction and causing the plunger to tilt and slide along the second wall portion when the handle is actuated in the second direction;

a visual indicia providing the user the choice of selecting to actuate the handle in the first direction to slide the plunger along the first wall portion to release a first flush volume of water or to actuate the handle in the second direction to tilt the plunger onto the second wall portion and slide it along the second wall portion to release a second flush volume of water, one of the first flush volume of water and the second flush volume of water being a full flush necessary for evacuating solid waste and the other of the first flush volume of water and the second flush volume of water being adequate for evacuating liquid waste.

21. The handle assembly of claim 20, further comprising a mark on the outside of the socket to permit a desired orientation of the first wall portion and the second wall portion.

22. The handle assembly of claim 21, further comprising a nut for attaching the handle assembly to the valve body, the nut being separate from the handle to allow attachment of the handle in a desired orientation of the first wall portion and the second wall portion and to allow the desired orientation of the visual indicia.

23. In a water flush valve including a valve body, a stem for releasing water when said stem is displaced, a bushing, a plunger mounted in the bushing, said plunger traveling along a first axis to displace the stem when the plunger is actuated to release a full flush volume of water required to evacuate solid waste, the improvement comprising said bushing having a passage with an enlarged space therein to allow the plunger to follow a second axis when the plunger is actuated to tilt into the enlarged space, the plunger traveling along the second axis to release a reduced flush volume of water, adequate to evacuate liquid waste, said plunger following the first axis to produce the full flush when the plunger is actuated without tilting.

* * * * *